(12) United States Patent
Miyauchi

(10) Patent No.: US 12,223,261 B2
(45) Date of Patent: Feb. 11, 2025

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Takashi Miyauchi, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 1014 days.

(21) Appl. No.: 17/193,683

(22) Filed: Mar. 5, 2021

(65) Prior Publication Data

US 2021/0286991 A1  Sep. 16, 2021

(30) Foreign Application Priority Data

Mar. 12, 2020  (JP) ................ 2020-043075
Sep. 3, 2020  (JP) ................ 2020-148383

(51) Int. Cl.

| | |
|---|---|
| *G06V 30/41* | (2022.01) |
| *G06F 18/22* | (2023.01) |
| *G06F 40/174* | (2020.01) |
| *G06F 40/284* | (2020.01) |
| *G06V 10/74* | (2022.01) |

(Continued)

(52) U.S. Cl.
CPC ............ *G06F 40/174* (2020.01); *G06F 18/22* (2023.01); *G06F 40/284* (2020.01); *G06V 10/761* (2022.01); *G06V 30/19007* (2022.01); *G06V 30/268* (2022.01); *G06V 30/413* (2022.01); *G06V 30/414* (2022.01); *G06V 30/416* (2022.01); *G06V 30/10* (2022.01)

(58) Field of Classification Search
CPC ...... G06F 40/174; G06F 16/583; G06F 18/22; G06F 18/2135; G06F 40/109; G06F 40/284; G06V 30/10; G06V 30/413; G06V 10/761; G06V 30/414; G06V 30/416; G06V 20/64; G06V 30/142; G06V 30/1444; G06V 30/1456; G06V 30/147; G06V 30/19007; G06V 30/268; G06V 40/1335; G06V 40/172; H04N 1/00331

See application file for complete search history.

(56) References Cited

U.S. PATENT DOCUMENTS 5,854,853 A * 12/1998 Wang ................ G06V 30/40
                                                      382/176
10,652,409 B2    5/2020 Soga ................. G06K 9/00456
(Continued)

FOREIGN PATENT DOCUMENTS

JP    2019-128715    8/2019

*Primary Examiner* — Ian L Lemieux
(74) *Attorney, Agent, or Firm* — Venable LLP

(57) ABSTRACT

An image processing apparatus includes at least one memory that stores instructions; and at least one processor that execute the instructions to perform: detecting text blocks in an input image; determining a registered document corresponding to the input image among a plurality of registered documents; determining the text block in the input image that corresponds to a processing target item, based on a partial layout defined in the determined registered document and including a first text block corresponding to the processing target item and at least one second text block present near the first text block; and obtaining a character string corresponding to the processing target item by performing character recognition processing on the determined text block.

15 Claims, 26 Drawing Sheets

(51) Int. Cl.
*G06V 30/19* (2022.01)
*G06V 30/262* (2022.01)
*G06V 30/413* (2022.01)
*G06V 30/414* (2022.01)
*G06V 30/416* (2022.01)
*G06V 30/10* (2022.01)

(56) References Cited

U.S. PATENT DOCUMENTS

| | | | |
|---|---|---|---|
| 10,706,581 B2* | 7/2020 | Miyauchi | G06V 30/414 |
| 2011/0286043 A1* | 11/2011 | Hagisawa | G06V 30/1444 |
| | | | 358/1.15 |
| 2015/0169951 A1* | 6/2015 | Khintsitskiy | G06V 30/418 |
| | | | 382/182 |
| 2017/0185859 A1* | 6/2017 | Nanaumi | G06V 30/147 |
| 2019/0087444 A1* | 3/2019 | Arakawa | H04N 1/4074 |
| 2019/0230232 A1 | 7/2019 | Soga | H04N 1/0044 |
| 2019/0266397 A1* | 8/2019 | Arakawa | G06V 30/418 |
| 2021/0227082 A1* | 7/2021 | Mori | H04N 1/00331 |

* cited by examiner

Quotation  ABC

To:  Date: 2019/04/01
XXX-XXX-XXXX  #: 1234
hijk Imn Co.

| ID  | Description | Quantity | Line Total |
|-----|-------------|----------|------------|
| P01 | Product1    | 5        | 150.00     |
| P02 | Product2A   | 2        | 100.00     |
| P03 | Product3    | 4        | 200.00     |
|     |             | Total    | 450.00     |

Notes:

Sender:
XXX-XXX-XXXX
ABC Co.

Quotation

RBC

To:
XXX-XXX-XXXX
hijk Imn Co.

Date: 2019/04/01
: 1234 — 1001

| ID | Description | Quantity | Line Total |
|----|-------------|----------|------------|
| P01 | Product1 | 5 | 150.00 |
| P02 | Product2A | 2 | 100.00 |
| P03 | Product3 | 4 | 200.00 |

Total  450.00 — 1002

Notes:

Sener:
XXX-XXX-XXXX
ABC Co. — 1003

FIG.10A

Quotation

To:
XXX-XXX-XXXX
hijk Imn Co.

Date: 2019/04/01
:1234

| ID | Description | Quantity | Line Total |
|----|-------------|----------|------------|
| P01 | Product1 | 5 | 150.00 |
| P02 | Product2A | 2 | 100.00 |
| P03 | Product3 | 4 | 200.00 |
| | | Total | 450.00 |

Notes:

Sener: — 1005
XXX-XXX-XXXX — 1004
ABC Co. — 1003

Quotation         ABC

1008 — To:                    Date: 2019/04/01
              XXX-XXX-XXXX        #: 1234
    1010 — hijk Imn Co.

ID    Description   Quantity   Line Total
           P01   Product1      5          150.00
           P02   Product2A     2          100.00
           P03   Product3      4          200.00
                                   Total  450.00

Notes: [        ]   Sener:
                               XXX-XXX-XXXX
                               ABC Co.

FIG.10C

Quotation

To:
XXX-XXX-XXXX
hijk lmn Co.

Date: 2019/04/01
:1234

| ID  | Description | Quantity | Line Total |
|-----|-------------|----------|------------|
| P01 | Product1    | 5        | 150.00     |
| P02 | Product2A   | 2        | 100.00     |
| P03 | Product3    | 4        | 200.00     |
|     |             | Total    | 450.00     |

Notes:

Sender: — 1005
XXX-XXX-XXXX — 1004
ABC Co. — 1003

Quotation

To:
XXX-XXX-XXXX
hijk Imn Co.

Date: 2019/04/03
: 1258

| ID | Description | Quantity | Line Total |
|----|-------------|----------|-----------|
| P01 | Product1 | 4 | 120.00 |
| P02 | Product2A | 2 | 100.00 |
| P04 | Product4 | 1 | 50.00 |
| P05 | Product5 | 2 | 100.00 |
|  |  | Total | 370.00 |

Notes:

Sender
XXX-XXX-XXXX
ABC Co.

Quotation　　　ABC

To:　　　　　　Date:2019/04/01
XXX-XXX-XXXX　#:1234
hijk Imn Co.

| ID | Description | Quantity | Line Total |
|----|-------------|----------|------------|
| P01 | Product1 | 5 | 150.00 |
| P02 | Product2A | 2 | 100.00 |
| P03 | Product3 | 4 | 200.00 |
| | | Total | 450.00 |

Notes:　　　　　Sender:
　　　　　　　　XXX-XXX-XXXX
　　　　　　　　ABC Co.

FIG.15A

```
                1008    1009    1000    1011        1501
                  |      |       |       |            |
                                Quotation      ABC To:                    Date: 2019/04/01  — 1013
                  XXX-XXX-XXXX           #: 1234            — 1001
                  hijk lmn Co.
         1010                                               1012

ID      Description   Quantity   Line Total
            P01     Product1         5         150.00
            P02     Product2A        2         100.00
            P03     Product3         4         200.00
                                   Total       450.00

Notes:  [       ]      Sender:
                                   XXX-XXX-XXXX
                                   ABC Co.
```

FIG.15B

REGISTERED DOCUMENT

| Customer Number | AAA1234 |
|---|---|
| Quotation Number | Q3456789 |
| Quotation Date | 4/30/2019 |
| Sales Person | ABC DEFGH |
| Payment Terms | Credit Card |
| Expiration Date | 5/29/2019 |

FIG.17A

Customer Number　　AAA1234　　　　1700
Quotation Number ~1701　Q3456789 ~1704
Quotation Date ~1702　4/30/2019 ~1705
Sales Person ~1703　ABC DEFGH ~1706
Payment Terms　　Credit Card
Expiration Date　　5/29/2019

FIG.17B

INPUT DOCUMENT

| Customer Number | AAA1234 |
|---|---|
| Quotation Number | Q3456820 |
| Quotation Date | 5/17/2019 |
| Sales Person | ABC DEFGH |
| Payment Terms | Credit Card |
| Expiration Date | 6/16/2019 |

| Customer Number | AAA1234 |
| Quotation Number | Q3456820 |
| Quotation Date | 5/17/2019 |

Sales Person ABC DEFGH
Payment Terms Credit Card
Expiration Date 6/16/2019

FIG.18B

Customer Number AAA1234

1802

| Quotation Number | Q3456820 |
| Quotation Date | 5/17/2019 |
| Sales Person | ABC DEFGH |

Payment Terms Credit Card
Expiration Date 6/16/2019

FIG.18C

Customer Number AAA1234
Quotation Number Q3456820

1803

| Quotation Date | 5/17/2019 |
| Sales Person | ABC DEFGH |
| Payment Terms | Credit Card |

Expiration Date 6/16/2019

FIG.18D

Customer Number AAA1234
Quotation Number Q3456820
Quotation Date 5/17/2019

1804

| Sales Person | ABC DEFGH |
| Payment Terms | Credit Card |
| Expiration Date | 6/16/2019 |

FIG.18E

REGISTERED
DOCUMENT

| Customer Number | AAA1234 |
|---|---|
| Quotation Number | Q3456789 |
| Quotation Date | 4/30/2019 |
| Sales Person | ABC DEFGH |
| Payment Terms | Credit Card |
| Expiration Date | 5/29/2019 |

| Customer Number | AAA1234 |
|---|---|
| Quotation Number | Q3456789 |
| Quotation Date | 4/30/2019 |

Sales Person     ABC DEFGH
Payment Terms    Credit Card
Expiration Date  5/29/2019

FIG.19B

Customer Number  AAA1234

1902

| Quotation Number | Q3456789 |
|---|---|
| Quotation Date | 4/30/2019 |
| Sales Person | ABC DEFGH |

Payment Terms    Credit Card
Expiration Date  5/29/2019

FIG.19C

Customer Number  AAA1234
Quotation Number Q3456789

1903

| Quotation Date | 4/30/2019 |
|---|---|
| Sales Person | ABC DEFGH |
| Payment Terms | Credit Card |

Expiration Date  5/29/2019

FIG.19D

Customer Number  AAA1234
Quotation Number Q3456789
Quotation Date   4/30/2019

1904

| Sales Person | ABC DEFGH |
|---|---|
| Payment Terms | Credit Card |
| Expiration Date | 5/29/2019 |

| 2001 | 2002 | 2003 |
|---|---|---|
| SIMILAR POSITIONS | ASSOCIATION IN DESCENDING ORDER | ASSOCIATION IN ASCENDING ORDER |
| 1901 | 1801 | 1801 |
| 1902 | 1802 | 1802 |
| 1903 | 1803 | 1803 |
| 1904 | 1804 | 1804 |

NUMBER OF SIMILAR POSITIONS IS SAME AS
NUMBER OF XY CANDIDATE POSITIONS

FIG.20A

| 2011 | 2012 | 2013 |
|---|---|---|
| SIMILAR POSITIONS | ASSOCIATION IN DESCENDING ORDER | ASSOCIATION IN ASCENDING ORDER |
| 1901 | 1801 | 1802 |
| 1902 | 1802 | 1803 |
| 1903 | 1803 | 1804 |

NUMBER OF SIMILAR POSITIONS IS SMALLER
(CASE WHERE 1904 IS ABSENT)

FIG.20B

| 2021 | 2022 | 2023 |
|---|---|---|
| SIMILAR POSITIONS | ASSOCIATION IN DESCENDING ORDER | ASSOCIATION IN ASCENDING ORDER |
| 1901 | 1801 | NONE |
| 1902 | 1802 | 1801 |
| 1903 | 1803 | 1802 |
| 1904 | NONE | 1803 |

NUMBER OF XY CANDIDATE POSITIONS IS SMALLER
(CASE WHERE 1804 IS ABSENT)

FIG.20C

IMAGE PROCESSING APPARATUS, IMAGE PROCESSING METHOD, AND STORAGE MEDIUM

BACKGROUND OF THE DISCLOSURE

Field of the Disclosure

The present disclosure relates to a technique of extracting an index included in an image.

Description of the Related Art

There is a method of extracting a character string of a desired item (hereinafter, referred to as index) included in a scanned image obtained by scanning a paper document such as a form with an image reading apparatus. Optical character recognition (OCR) processing is necessary to extract the index from the contents of the document. However, if the OCR processing is executed on the entire scanned image, processing load increases and user waiting time increases in some cases.

Japanese Patent Laid-Open No. 2019-128715 discloses a method in which information on a region including the index is registered in advance for each type of document and the index is extracted from the scanned image by partially performing the OCR processing on the registered index region.

However, the position of a character string region (hereinafter, referred to as text block) including the index is sometimes shifted depending on the written contents even in the same type of document. Accordingly, the extraction of the index sometimes fails in the case where the partial OCR processing is performed on the registered index region.

SUMMARY OF THE DISCLOSURE

An object of the technique in the present disclosure is to extract an extraction target index even in the case where the position of a text block in a scanned image is shifted from a registered position.

An image processing apparatus of the present disclosure is an image processing apparatus comprising: at least one memory that stores instructions; and at least one processor that execute the instructions to perform: detecting text blocks in an input image; determining a registered document corresponding to the input image among a plurality of registered documents; determining the text block in the input image that corresponds to a processing target item, based on a partial layout defined in the determined registered document and including a first text block corresponding to the processing target item and at least one second text block present near the first text block; and obtaining a character string corresponding to the processing target item by performing character recognition processing on the determined text block.

Further features of the present disclosure will become apparent from the following description of exemplary embodiments with reference to the attached drawings.

BRIEF DESCRIPTION OF THE DRAWINGS

FIGS. 6A and 6B are views illustrating an example of block selection processing;

FIGS. 10A to 10C are views illustrating an example of a partial pattern;

FIGS. 11A to 11C are views explaining processing of determining Y candidate positions;

FIGS. 15A and 15B are views for explaining a method of determining a partial pattern range;

FIGS. 17A and 17B are views illustrating an example of the partial pattern;

FIGS. 18A to 18E are views illustrating examples of XY candidate positions;

FIGS. 19A to 19E are views illustrating examples of similar positions; and

FIGS. 20A to 20C are views explaining association of the similar positions and the XY candidate positions.

DESCRIPTION OF THE EMBODIMENTS

Embodiments are described below in detail with reference to the attached drawings. Note that the following embodiments do not limit the techniques of the present disclosure according to the scope of claims and not all of the combinations of characteristics described in the embodiments are necessary for solving means of the techniques of the present disclosure.

Embodiment 1

An image forming apparatus of this embodiment scans an original document and generates a file name by combining character strings of predetermined items included in an image of a head page of an obtained scanned image. Then, the image forming apparatus recommends the generated file name to a user as a file name of the scanned image. However, extracting the character strings of the predetermined items from the scanned image sometimes causes an increase in processing load.

Accordingly, information on positions of text blocks of the predetermined items is registered for each type of document. It is conceivable to then determine the type of the document in the scanned image and extract the character strings of the predetermined items from the scanned image, based on the positions of the text blocks registered in the determined document. However, in this case, the positions of the text blocks in the scanned image are sometimes different from the registered positions due to changes in written contents and the like even if the document in the scanned image is the same type of document as the determined document.

Figure 11C:
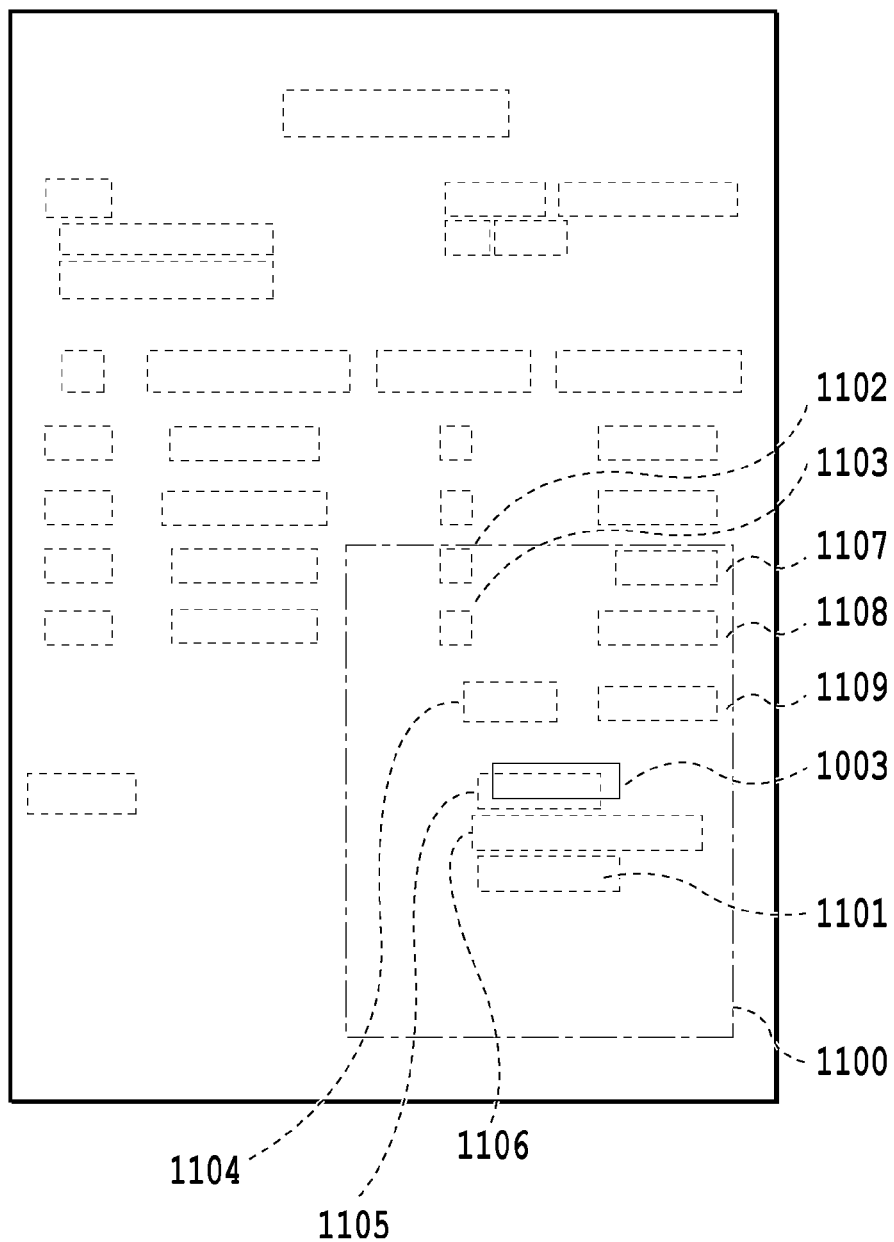

For example, assume that a document of FIG. 11A is registered and information indicating the position of a text block 1003 is registered as information on a region including a character string indicating an issuer company name. Meanwhile, FIG. 11B is a scanned image obtained by scanning the same type of document as FIG. 11A but the number of item rows in a table structure is greater than that in FIG. 11A and a text block 1101 of an issuer company name to be extracted is shifted to a lower position than that in FIG. 11A. Accordingly, even if the image forming apparatus can determine that the document scanned to obtain the scanned image of FIG. 11B is the same type of document as FIG. 11A, the image forming apparatus sometimes fails to extract the character string indicating the issuer company name in the image of FIG. 11B. Description of FIG. 11C is given later.

Accordingly, in the embodiment, in order to extract a text block of an item included in a scanned image, there is used a layout of a text block indicating the item and at least one other text block in the same type of document as a scanned original document. In the embodiment, description is given of a method of searching the scanned image for a region with a high matching degree with the aforementioned layout and assuming a text block of the item included in the scanned image based on a result of the search.

Note that, in the embodiment, coordinates in the image are based on, for example, a coordinate system in which: an upper left point is the origin; the vertical direction is a Y-direction; and the horizontal direction in which characters in each string are successively arranged is an X-direction. For example, coordinate values of an upper left point of each text block is held as the position of the text block.

[System Configuration]

Figure 1:
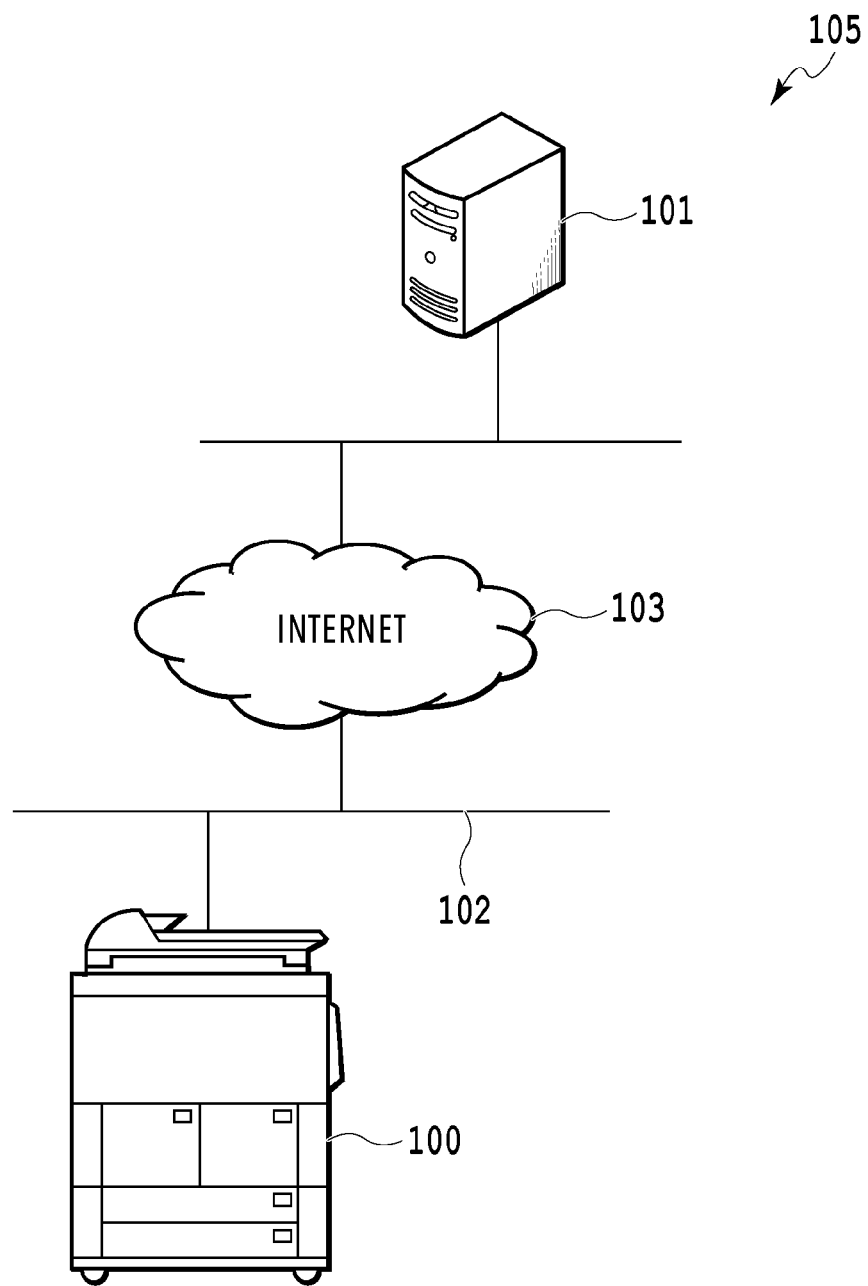
FIG. 1 is a diagram illustrating a configuration example of a system.

FIG. 1 is a diagram illustrating an overall configuration of a system to which the embodiment can be applied. A system 105 of the embodiment includes an image forming apparatus 100 and a terminal 101. As illustrated in FIG. 1, the image forming apparatus 100 is connected to a LAN 102 and can communicate with the terminal 101 such as a PC via the Internet 103 or the like. Note that the embodiment may include no terminal 101 and be formed only of the image forming apparatus 100.

The image forming apparatus 100 is a multi-function peripheral (MFP) including a display-operation unit 123 (see FIG. 2), a scanner unit 122 (see FIG. 2), a printer unit 121 (see FIG. 2), and the like. The image forming apparatus 100 can be used as a scanning terminal that scans an original document by using the scanner unit 122. Moreover, the image forming apparatus 100 includes the display-operation unit 123 such as a touch panel and a hardware button and displays recommendation results of a file name and a storage destination and a user interface for receiving instructions from the user.

[Hardware Configuration of Image Forming Apparatus]

Figure 2:
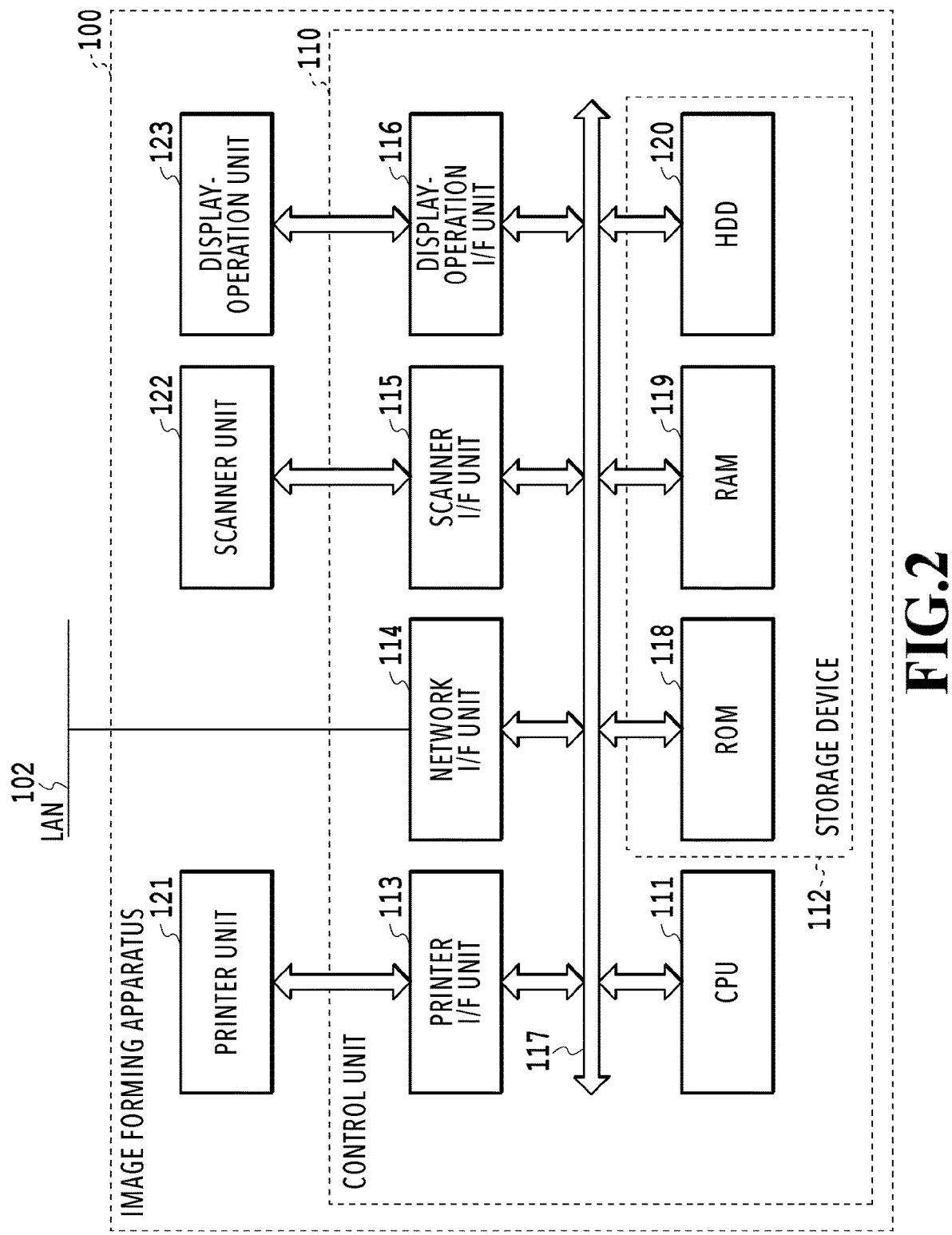
FIG. 2 is a diagram illustrating a hardware configuration example of an image forming apparatus.

FIG. 2 is a block diagram illustrating a hardware configuration of the image forming apparatus 100. The image forming apparatus 100 of the embodiment includes the display-operation unit 123, the scanner unit 122, the printer unit 121, and a control unit 110.

The control unit 110 includes a central processing unit (CPU) 111, a storage device 112 (read-only memory (ROM) 118, random access memory (RAM) 119, hard disk drive (HDD) 120)), a printer interface (I/F) unit 113, a network I/F unit 114, a scanner I/F unit 115, and a display-operation I/F unit 116. Moreover, in the control unit 110, these units are communicably connected to one another via a system bus 117. The control unit 110 controls operations of the entire image forming apparatus 100.

The CPU 111 reads and executes a control program stored in the storage device 112 to function as means for executing processes such as read control, image processing, and display control in the flowcharts to be described later.

The storage device 112 stores and holds the control program, image data, meta data, setting data, processing result data, and the like. The storage device 112 includes the ROM 118 that is a non-volatile memory, the RAM 119 that is a volatile memory, and the HDD 120 that is a large-capacity storage region. The ROM 118 is a non-volatile memory that holds the control program and the like and the CPU 111 reads the control program to perform control. The RAM 119 is a volatile memory that is used as a main memory of the CPU 111 and as a temporal storage region such as a work area.

The network I/F unit 114 connects the control unit 110 (image forming apparatus 100) to the LAN 102 via the system bus 117. The network I/F unit 114 transmits the image data to an external apparatus on the LAN 102 and receives various pieces of information from the external apparatus on the LAN 102.

The scanner I/F unit 115 connects the scanner unit 122 and the control unit 110 to each other via the system bus 117. The scanner unit 122 generates scanned image data by reading the original document and inputs the scanned image data into the control unit 110 via the scanner I/F unit 115. Note that the scanner unit 122 includes a document feeder and can continuously read multiple originals placed on a tray by feeding the originals one by one.

The display-operation I/F unit 116 connects the display-operation unit 123 and the control unit 110 to each other via the system bus 117. The display-operation unit 123 includes a liquid crystal display unit having a touch panel function, a hardware button, and the like.

The printer I/F unit 113 connects the printer unit 121 and the control unit 110 to each other via the system bus 117. The printer unit 121 receives the image data generated in the CPU 111 via the printer I/F unit 113 and performs print processing on print paper by using the received image data. As described above, in the image forming apparatus 100 according to the embodiment, the aforementioned hardware configuration can provide an image processing function.

[Functional Configuration of Image Forming Apparatus]

Figure 3:
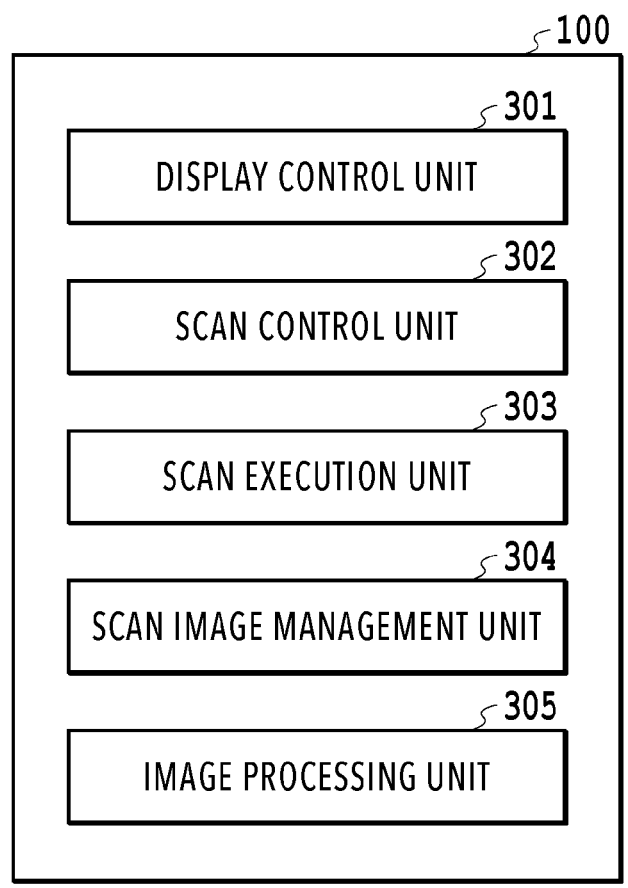
FIG. 3 is a diagram illustrating a functional configuration of the image forming apparatus.

FIG. 3 is a block diagram illustrating a functional configuration of the image forming apparatus 100. Note that FIG. 3 illustrates only the functions relating to processing of scanning, digitizing (filing), and saving the original document, among various functions of the image forming apparatus 100.

A display control unit 301 displays a user interface screen (UI screen) for receiving various user operations on the touch panel of the display-operation unit 123. The various user operations include, for example, scan setting, a scan start instruction, file name setting, a file save instruction, and the like.

A scan control unit 302 gives an instruction to execute scan processing to a scan execution unit 303 together with information on scan setting, in response to a user operation (for example, pressing of a "scan start" button) performed on the UI screen. The scan execution unit 303 causes the scanner unit 122 to execute an operation of reading the original document via the scanner I/F unit 115 and generate the scanned image data according to the scan processing execution instruction from the scan control unit 302. A scanned image management unit 304 saves the generated scanned image data in the HDD 120.

An image processing unit 305 performs image processing such as turn and tilt correction in addition to image analysis processing such as processing of detecting the text blocks, OCR processing (character recognition processing), and processing of determining similar documents, on the scanned image data. The image processing unit 305 enables the image forming apparatus 100 to function also as an image processing apparatus. A character string region detected from the scanned image is also referred to as "text block". Note that details of the image processing are described later.

Functions of the units in FIG. 3 are implemented by causing the CPU of the image forming apparatus 100 to extract program codes stored in the ROM onto the RAM and execute the program codes. Alternatively, some or all of the functions of the units in FIG. 3 may be implemented by hardware such as an application specific integrated circuit (ASIC) or an electronic circuit.

[Flowchart of Processing of Generating File of Scanned Image]

Description is given of entire processing in which the image forming apparatus 100 reads an original document, performs image processing on a scanned image of a front page of the original document, generates a file name by using character strings included in the scanned image, and recommends the file name to the user through the display-operation unit 123.

Figure 4:
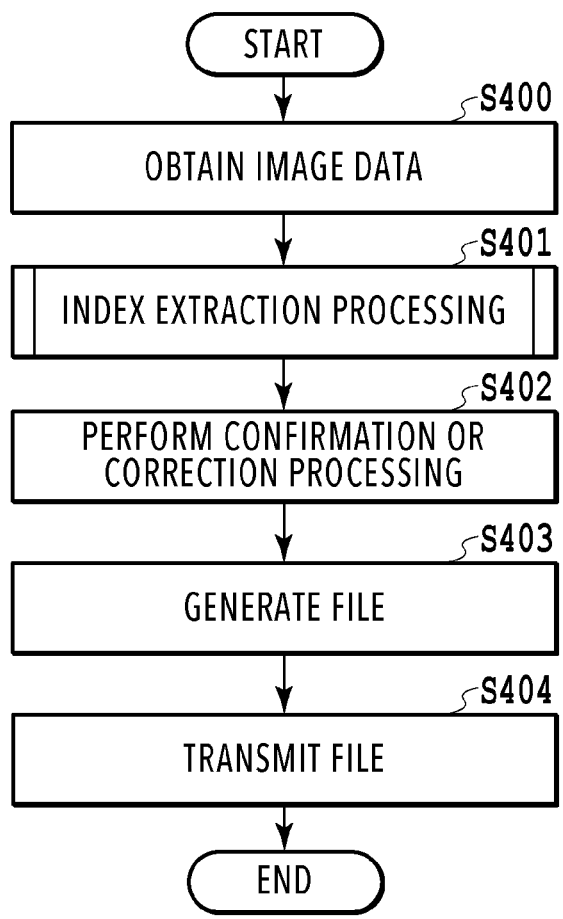
FIG. 4 is a flowchart of file generation processing for a scanned image.

A series of processes illustrated in the flowchart of FIG. 4 is performed by causing the CPU of the image forming apparatus 100 to extract the program codes stored in the ROM onto the RAM and execute the program codes. Moreover, some or all of the functions in the steps of FIG. 4 may be implemented by hardware such as an ASIC or an electronic circuit. Note that symbol "S" in the description of the processes means step in the flowchart and the same applies to the following flowcharts.

In S400, in the case where the scan control unit 302 receives the scan instruction from the user via the display-operation unit 123, the scan control unit 302 causes the scan execution unit 303 to read (scan) multiple original documents one by one from the tray of the document feeder in the scanner unit 122. Then, the scan control unit 302 obtains the image data of images (referred to as scanned images) obtained as a result of the scanning.

In S401, the image processing unit 305 performs processing (index extraction processing) of analyzing the image data obtained in S400 and extracting indices included in the scanned images. The "indices" are character strings of predetermined items such as a title of the document, a management number, a company name, and the like. In the embodiment, the indices are used as the file name or meta data in saving of the scanned image. Details of the index extraction processing in this step are described later by using FIG. 5.

A usage method of the indices is not limited to the generation of the file name or the extraction of the meta data. The indices may be used to set other property information such as folder path. That is to say, the file name and the meta data are types of information set as properties of the scanned image data.

In S402, the display control unit 301 generates the file name by using the indices extracted in S401 and displays the generated file name and the meta data on the display-operation unit 123 to present (recommend) them to the user. Moreover, the display control unit 301 receives confirmation or correction on the presented file name made by the user. If the display control unit 301 receives the confirmation from the user via the display-operation unit 123, the presented file name is determined as the file name of the scanned image and, if the display control unit 301 receives the correction, the corrected file name is determined as the file name of the scanned image. In the case where the user corrects the file name via the display-operation unit 123, index extraction rules are updated. The index extraction rules are described later.

In S403, the image processing unit 305 creates a file from the image data obtained in S400 and sets the file name determined in S402. In the embodiment, description is given assuming that the scanned image is saved in a file format of portable document format (PDF) as an example. In PDF, image data can be saved while being divided into pages and, in the case where multiple original documents are scanned in S400, pieces of image data corresponding to the respective original documents are stored as separate pages in one file.

In S404, the scanned image management unit 304 transmits the file created in S403 to a predetermined transmission destination through the LAN 102.

[Regarding Index Extraction Process (S401)]

Figure 5:
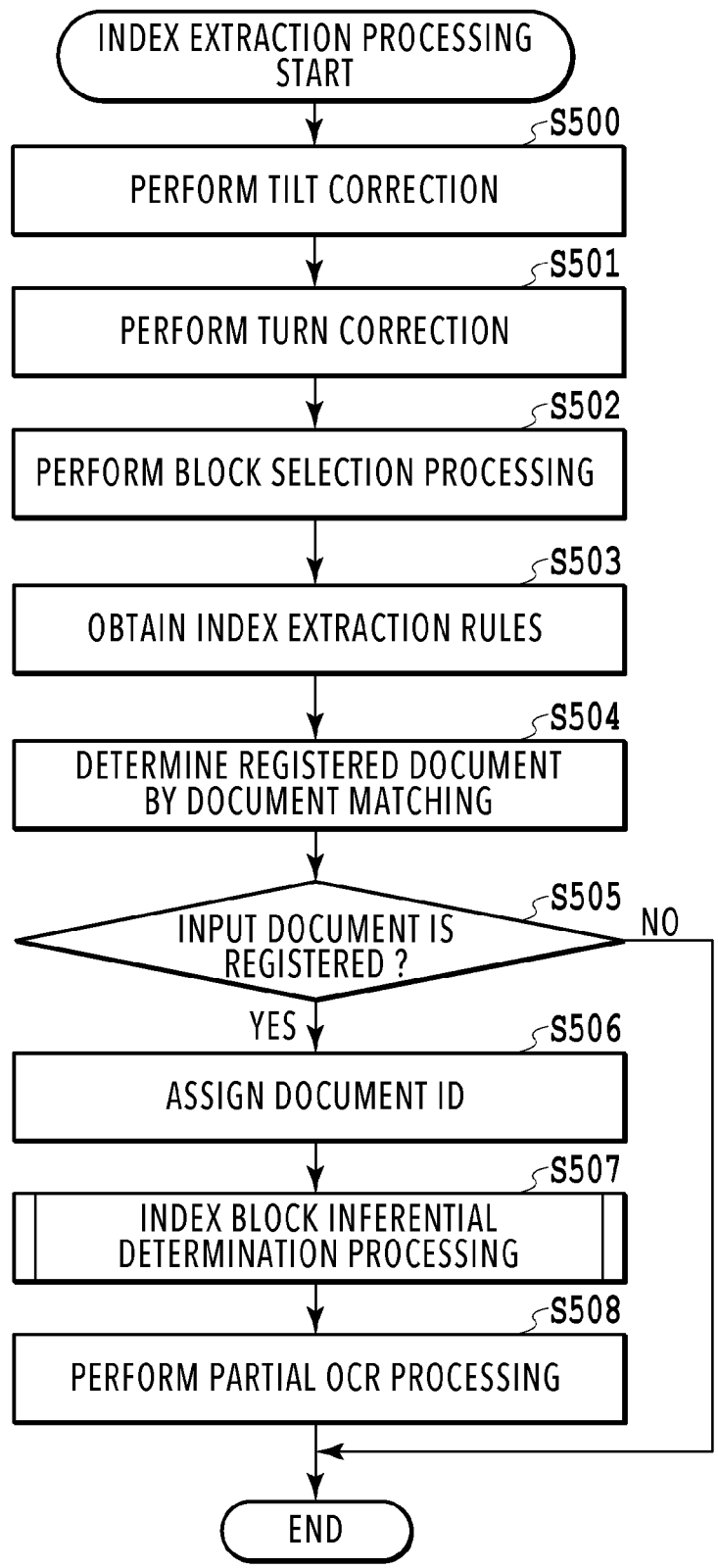
FIG. 5 is a flowchart of index extraction processing.

FIG. 5 is a flowchart illustrating details of the index extraction processing in S401. Details of the index extraction processing are described by using FIG. 5. In the index extraction processing, processing of correcting an orientation, determining a document type, and extracting indices depending on the document type is performed on one page of the image data.

In S500, the image processing unit 305 detects an angle of tilt of the scanned image from the image data and turns the image in the opposite direction to the detected tilt by an amount corresponding to the detected tilt to correct the tilt of the scanned image. The tilt to be corrected is caused by, for example, reading of the original document in a slanted manner due to friction of rollers in the document feeder of the scanner unit 122 or the like in the scanning of the original document. Moreover, the tilt occurs because the scanned original document has been printed in a slanted manner in the printing.

As a method of detecting an angle of the tilt, first, objects included in the image data are detected and objects adjacent to each other in the horizontal direction or the vertical direction are linked to one another. Then, how much an angle of a line connecting the center positions of the linked objects is tilted with respect to the horizontal direction or the vertical direction is derived to obtain the tilt. Note that the method of detecting the tilt is not limited to this method. Alternatively, for example, there may be used a method in which center coordinates of the objects included in the image data are obtained and the center coordinates are turned in increments of 0.1 degrees to obtain an angle at which a proportion of the center coordinates aligned in the horizontal direction or the vertical direction is the greatest as the tilt of the scanned image. Correcting the tilt of the scanned image can increase processing accuracy of turn correction, block selection processing, and OCR processing to be performed later.

In S501, the image processing unit 305 performs turn correction on the tilt-corrected scanned image obtained as a result of the processing of S500, by turning the image in increments of 90 degrees such that the characters in the image are arranged in a correct orientation. A method of turn correction is, for example, as follows. Four images that are a reference image being the tilt-corrected scanned image, an image obtained by turning the reference image 90 degrees, an image obtained by turning the reference image 180 degrees, and an image obtained by turning the reference image 270 degrees are prepared. Then, simple OCR processing capable of high speed processing is performed on each of the images and an image with the greatest number of characters recognized to have a certain level of reliability or more is set as a turn-corrected image. However, the method of turn correction is not limited to this method. Note that the scanned image hereinafter refers to the scanned image corrected in S500 and S501 unless otherwise noted.

In S502, the image processing unit 305 executes block selection processing on the scanned image. The block selection processing is processing of detecting the text blocks by classifying regions of the image into a foreground region and a background region and then dividing the foreground region into the text blocks and other blocks.

Specifically, the image processing unit 305 performs contour following on the scanned image subjected to black and white binarization and extracts blocks of pixels surrounded by black pixel contours. Then, the image processing unit 305 performs the contour following for white pixels in the block of black pixels with an area greater than a predetermined size to extract blocks of white pixels and recursively extracts blocks of black pixels from an inside of the block of white pixels with an area greater than a certain size. The image processing unit 305 determines that the blocks of black pixels thus obtained are foreground regions. The determined foreground regions are categorized depending on the size and shape to be categorized into regions with different properties. For example, the image processing unit 305 sets a foreground region with an aspect ratio close to 1 and with a size within a certain range as a pixel block corresponding to a character. Then, the image processing unit 305 determines that a region in which characters close to one another are aligned in a good manner and can be grouped into one is a character string region (TEXT). The image processing unit 305 determines that a flat pixel block is a line region (LINE). The image processing unit 305 determines that a range occupied by a black pixel block including rectangular white pixel blocks having a certain size or more and aligned in a good manner is a table region (TABLE). The image processing unit 305 determines that a region in which pixel blocks with indefinite shapes are scattered is a photo region (PHOTO). The image processing unit 305 determines that a pixel block with a shape other than those described above is a picture region (PICTURE). The foreground regions determined to have the property of characters (TEXT) among the regions divided depending on the property of the object are thereby detected as the text blocks.

Figure 6B:
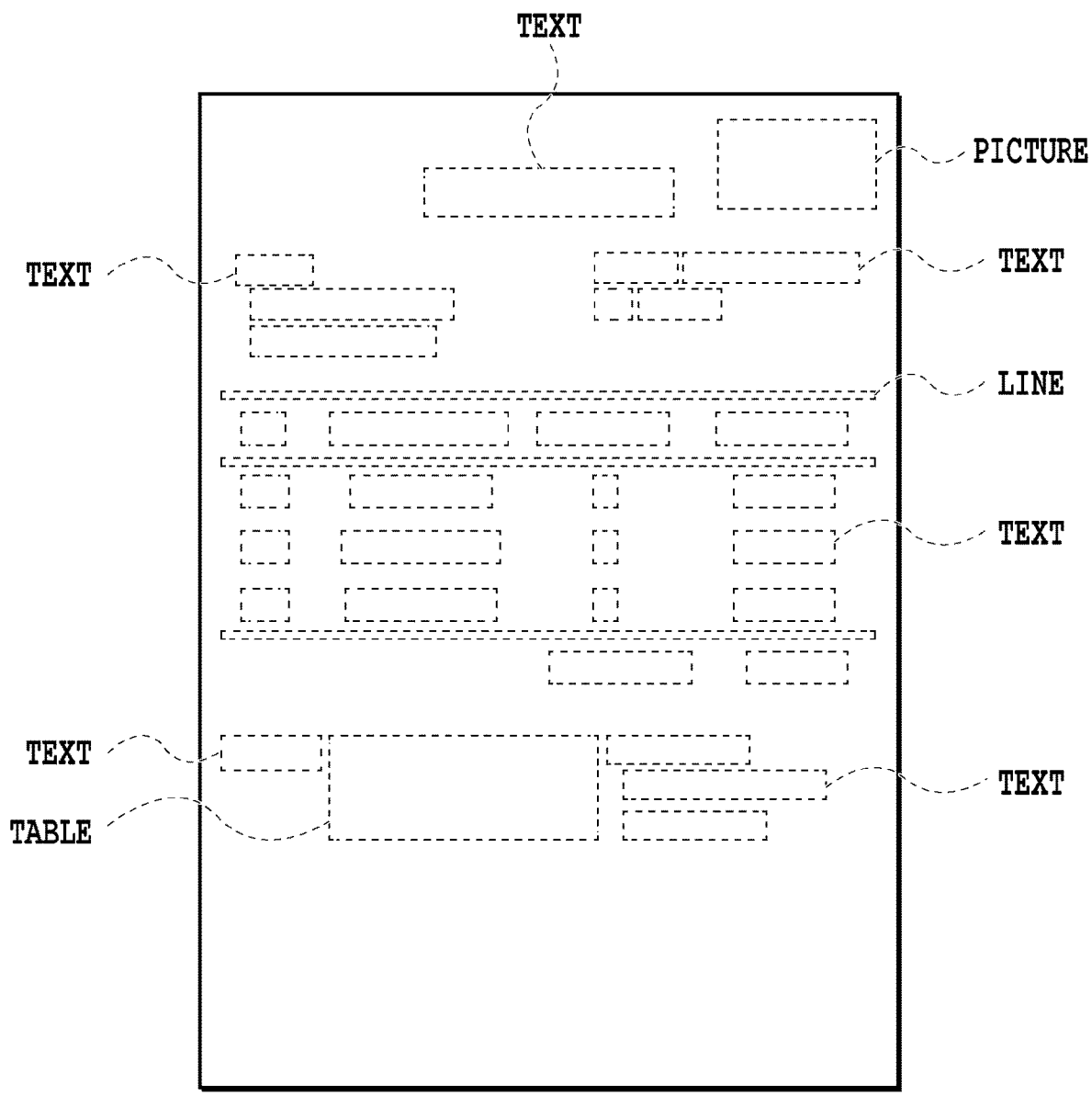

FIGS. 6A and 6B are views illustrating an example of a result of the block selection processing. FIG. 6A illustrates the turn-corrected scanned image. FIG. 6B illustrates a result of the block selection processing performed on the scanned image of FIG. 6A and rectangles illustrated by dotted lines indicate the foreground regions. Although the properties of all foreground regions are determined, only the properties of some of the foreground regions are illustrated in FIG. 6B. Information on each of the text blocks (information indicating the property and the size and position of each block) detected in this step is used for the OCR processing, similarity calculation, and the like that are subsequent processes.

In the block selection processing of this step, only the text blocks are detected. The reason for this is that the positions of character strings express the structure of the scanned image in a good manner and are closely related to index information.

Accordingly, this configuration does not eliminate usage of information on the blocks determined to have other properties such as the photo region and the table region in the subsequent processes.

In S503, the image processing unit 305 obtains the index extraction rules from the HDD 120 and extracts the index extraction rules onto the RAM 119.

Figure 7:
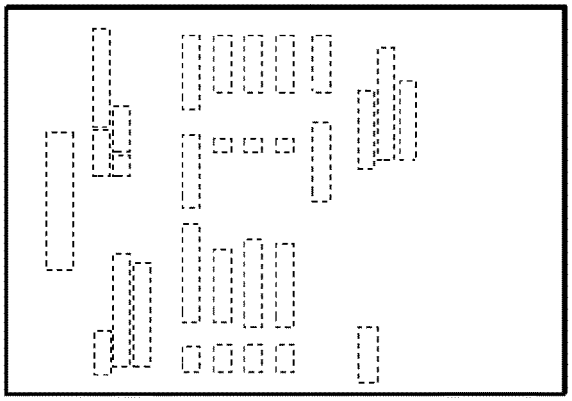
FIG. 7 is a view illustrating an example of index extraction rules.

FIG. 7 is a view illustrating part of the index extraction rules (hereinafter, simply referred to as extraction rules). FIG. 7 illustrates a registered extraction rule record to which "0001" is assigned as a document ID included in the extraction rules. In the extraction rules, pieces of data of "document ID", "thumbnail", "document identification information", and "index information" are associated with one another in a unit of record for one registered document. The extraction rules hold as many combinations (records) of data as the registered documents. The document ID is a unique ID indicating the type of the document.

The document identification information is information on the positions and sizes of the text blocks obtained as a result of executing the block selection processing on the scanned image of the registered document. The document identification information is information for determining the type of document and is used in document matching to be described later.

The index information is information for extracting the indices included in the scanned image. The indices are used to determine the meta data or the file name to be assigned to the file. Specifically, the index information includes information on the coordinates and sizes of the text blocks, including the character strings (indices) of the respective items, in the registered document. An image 701 of "index information" in FIG. 7 illustrate an image in which the positions and sizes of the text blocks including the character strings of the respective items are arranged at corresponding coordinates in the image. Moreover, the index information includes information indicating the indices used to generate the file name and the order of these indices and information to be assigned as the meta data.

A "file name rule" in the index information indicates that the file name is generated by connecting the indices of the items of title (title), issuer company name (sender), and form number (number) with underscores that are separators. Moreover, "meta data" indicates that the index of the item of total_price (total_price) is used as the meta data. In other words, generation of the file name to be recommended to the user and the extraction of the meta data can be performed by extracting indices of predetermined items.

Although the example in which the extracted indices are used as the file name or the meta data is described in the embodiment, the image forming apparatus may hold a rule for determining information on a folder being a file transmission destination that is other property information. Also in this case, the property information generated by using the index is recommended to the user in S402 and is set in the file of the scanned image in S403.

Moreover, as the extraction rules of the registered document, the image forming apparatus may also hold a thumbnail of the scanned image corresponding to the registered document as illustrated in the "thumbnail" of FIG. 7.

In S504, the image processing unit 305 executes the document matching on the scanned image. The document matching is processing as follows. The image processing unit 305 determines whether documents registered in the extraction rules includes the same type of document as the document (input document) scanned to obtain the scanned image. If the image processing unit 305 determines that the same type of document as the input document is registered, the image processing unit 305 determines the type of this document.

In the embodiment, first, the image processing unit 305 compares the scanned image and each of the documents registered in the extraction rules one to one and calculates a similarity degree indicating how similar the shapes and arrangement of the included text blocks are. As a method of calculating the similarity degree, for example, there is the following method. An entire set of text blocks in the scanned image is aligned with an entire set of text blocks in the registered document. Then, a square (referred to as value A) of the sum of the areas of regions in which the text blocks in the scanned image and the text blocks in the registered document overlap one another is obtained. Next, a product (referred to as value B) of the sum of the areas of the text blocks in the scanned image and the sum of the areas of the text blocks in the registered document is obtained. Then, a value obtained by dividing the value A by the value B is set as the similarity degree. The image processing unit 305 performs this similarity degree calculation for the scanned image and all documents registered in the extraction rules.

Then, the image processing unit 305 determines that the document having the highest similarity degree among the documents registered in the extraction rules and having a similarity degree of a predetermined value or higher is the same type of document as the scanned input document. Meanwhile, in the case where there is no document having a similarity degree of the predetermined value or higher, the image processing unit 305 determines that the same type of document as the input document is not registered in the extraction rules.

In S505, the image processing unit 305 determines whether the same type of document as the input document is registered in the extraction rules based on the result of the document matching executed in S504. If the input document is not the registered document (NO in S505), the processing in this flowchart is terminated. If the input document is not the registered document, a new ID is assigned as described above and the layout information and the like of the text blocks detected in S502 are registered in the extraction rules. In this case, the file name or the meta data are not recommended to the user in S402 and the display control unit 301 receives input of the file name from the user. In the case where the display control unit 301 receives the input of the file name from the user via the display-operation unit 123, the inputted file name is determined as the file name of the scanned image.

If the same type of document as the input document is registered (YES in S505), in S506, the image processing unit 305 assigns the same document ID as the document in the extraction rules determined to be the same type as the input document in S504, to the scanned image.

In S507, the image processing unit 305 executes index block inferential determination processing of inferentially determining the text blocks including indices of extraction target (processing target) items in the scanned image based on the extraction rules linked to the document ID assigned in S506. The text blocks including character strings (indices) indicating the items such as the title, the issuer company name, and the form number is sometimes referred to as index blocks. Details of the index block inferential determination processing are described later.

In S508, the image processing unit 305 executes partial OCR on the index blocks of the respective items inferentially determined in S507 and extract character strings corresponding to the respective index blocks as indices.

[Regarding Index Block Inferential Determination Processing (S507)]

Figure 8:
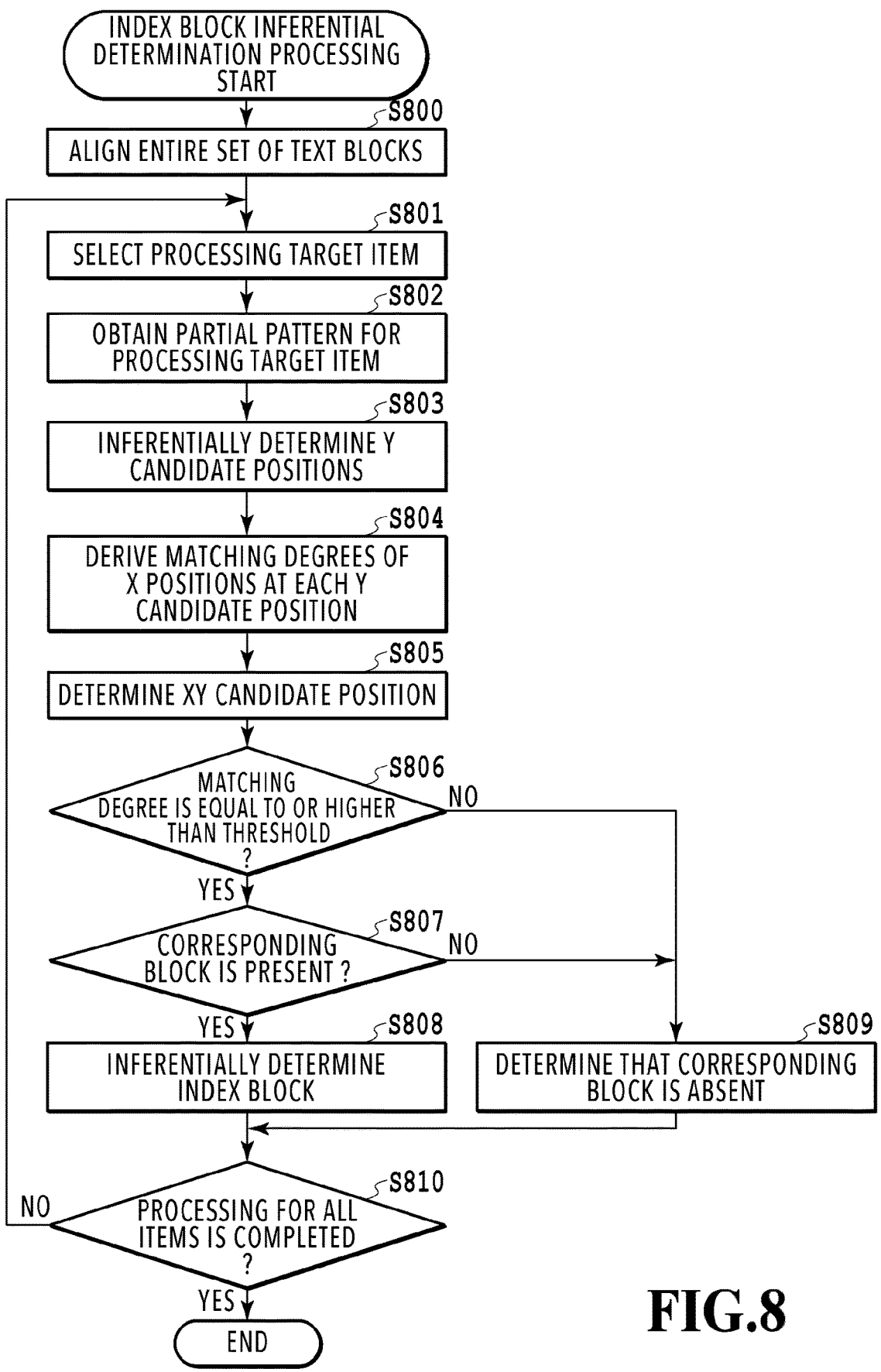
FIG. 8 is a flowchart of index block inferential determination processing.

FIG. 8 is a flowchart of the index block inferential determination processing in S507. Details of the index block inferential determination processing are described by using FIG. 8. Hereinafter, the registered document refers to the document corresponding to the document ID assigned to the scanned image in S506 among the documents registered in the extraction rules obtained in S503. In the description of this flowchart, description is given assuming that the registered document is the document with the document ID of "0001" in FIG. 7.

In S800, the image processing unit 305 obtains the document identification information linked with the document ID assigned in S506, from the extraction rules. Then, the image processing unit 305 aligns the entire set of text blocks in the scanned image with the entire set of text blocks in the registered document.

The input document of the scanned image obtained in S400 is the same type of document as the registered document and the items in the input document are printed at the same coordinates as the items in the registered document, respectively. However, the positions of the text blocks in the scanned image are sometimes shifted from the positions of the text blocks in the registered document due to timing of printing or scanning, differences depending on the apparatus used in printing, or the like. Accordingly, in this step, alignment of the entire set of text blocks is performed to reduce effects of the shifting and increase accuracy of the subsequent processes. Note that, since the tilt correction is performed in S500 of FIG. 5 in the embodiment, description is given of an example in which, in the alignment of the entire set of text blocks in this step, the image processing unit 305 performs only the correction in which the entire set of text blocks in the scanned image is shifted (translated).

In the alignment of the entire set of text blocks, the image processing unit 305 calculates a shift amount indicating how much the text blocks in the scanned image are shifted with respect to the text blocks in the registered document and corrects the coordinates such that the text blocks in the scanned image are shifted by an amount corresponding to the shift amount.

Figure 9:
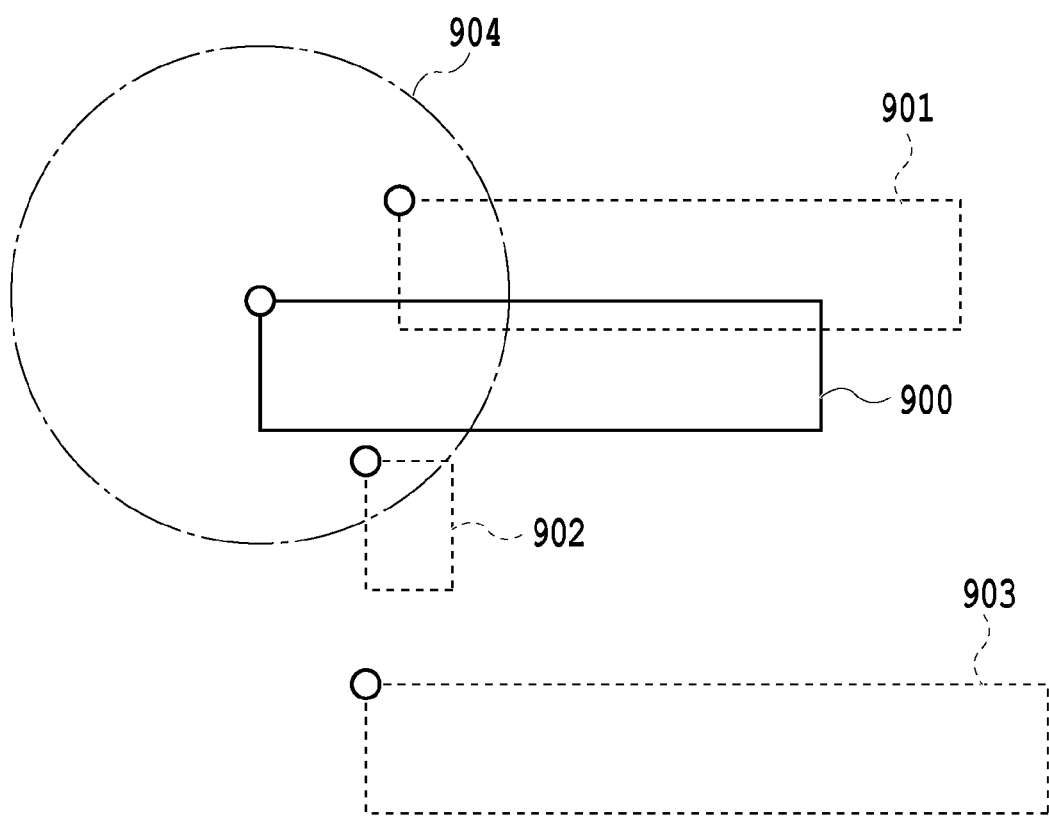
FIG. 9 is a view explaining a method of determining a pair block.

FIG. 9 is a partial cut-out view of an image obtained by drawing the text block in the scanned image and the text blocks in the registered document on the same coordinate system. A specific procedure for calculating the shift amount for the alignment of the entire set of text blocks is described by using FIG. 9. In FIG. 9, a solid line rectangle illustrates one text block 900 selected from the text blocks in the scanned image and broken line rectangles illustrate text blocks 901 to 903 in the registered document around the text block 900. Moreover, in FIG. 9, a one-dot chain line circle 904 illustrates a range of a certain distance from the upper left vertex of the text block 900 in the scanned image.

For each of the text blocks in the scanned image, the image processing unit 305 determines the text block (hereinafter referred to as pair block) in the registered document that serves as a candidate for the text block corresponding to the text block in the scanned image to calculate the shift amount. Determination of the pair block for each text block in the scanned image is described.

First, the image processing unit 305 searches a group of the text blocks 901 to 903 in the registered document, for a text block whose upper left vertex is included in the circle 904 centered at the upper left vertex of one text block 900 selected from the text blocks in the scanned image. In FIG. 9, the text block 901 and 902 fall into the category of such a text block. Next, the image processing unit 305 obtains an overlap ratio between the text block 900 in the scanned image and each of the text blocks 901 and 902 in the registered document. The overlap ratio is obtained by aligning the upper left vertex of the text block in the scanned image with that of the text block in the registered document and calculating the area of a portion common to both text blocks. Then, a value is obtained based on (area of common portion)/(area of larger one of text blocks) and is set as the overlap ratio.

The image processing unit 305 sets the text block in the registered document whose overlap ratio satisfies a predetermined condition as the pair block. The predetermined condition is, for example, such a condition that the overlap ratio with the text block in the scanned image is equal to or higher than a value obtained by multiplying the maximum overlap ratio by a coefficient $\alpha$ and is equal to or higher than a predetermined threshold. In this case, the coefficient $\alpha$ is used to select a combination with an overlap ratio close to the maximum overlap ratio and is set to a value less than 1.0 such as, for example, 0.5 to 0.8. Moreover, the predetermined threshold is used to define the minimum level and is set to a value less than 1.0 such as, for example, 0.3 to 0.7.

In FIG. 9, out of the text blocks 901 and 902 in the registered document, only the text block 901 having a shape close to the text block 900 in the scanned image is selected as the pair block. If there are other text blocks that satisfy the predetermined condition, multiple pair blocks are selected in some cases. The image processing unit 305 calculates difference amounts (shift amounts), in the X direction and the Y direction, between the upper left vertex of one text block selected from the scanned image and the upper left vertex of each of the pair blocks corresponding to the selected text block in the scanned image as described above. Then, the image processing unit 305 votes for the difference amounts in a shift amount histogram. In this case, any range may be set for bins of the histogram.

In the case of FIG. 9, for the text block 900, the difference amounts (shift amounts), in the X direction and the Y direction, between the upper left vertex of the text block 900 and the upper left vertex of the text block 901 in the registered document are calculated and the shift amounts are voted for in the shift amount histogram.

The image processing unit 305 performs processing from the determination of the pair blocks corresponding to the text block in the scanned image to the voting in the shift amount histogram for all text blocks in the scanned image. Then, the image processing unit 305 determines a position of the maximum peak point in the finally-obtained shift amount histogram. The shift amounts indicated by the determined position are set as the shift amounts in the alignment of the entire set of text blocks.

Note that, in the case where there is a concern of an effect of noise, the generated shift amount histogram may be subjected to smoothing. Moreover, the configuration may be such that local peak points other than the maximum peak point are selected as candidates of the shift amount and the shift amount to be used in the alignment of the entire set of text blocks is selected from these candidates. For example, the configuration may be as follows. For each of the shift amount candidates, the coordinates of the text block in the scanned image are shifted and similarity degree calculation similar to the document matching in S504 of FIG. 5 is performed. Then, the candidate with the highest similarity is determined as the final shift amount.

Shifting the coordinates of each text block in the scanned image by the shift amounts determined in the aforementioned process allows the image forming apparatus to obtain the aligned text blocks in the scanned image. Note that the method of aligning the text blocks is not limited to the aforementioned method. Although description is given of the example in which only the correction relating to the shifting (translation) of the entire scanned image is performed, in the case where shifting relating to magnification is assumed to occur as shifting in printing and scanning, alignment considering not only the shift amount but also shifting of magnification may be performed.

The scanned image or the text blocks in the scanned image in the following steps are assumed to refer to the scanned image or the text blocks subjected to the aforementioned alignment of the entire set of text blocks.

Next, the image processing unit 305 obtains the index information of the registered document linked to the document ID assigned in S506. Then, in S801, the image processing unit 305 selects one of the items of the indices included in the index information as the processing target and repeats S801 to S810. Then, the image processing unit 305 performs processing of inferentially determining the text block of the processing target item among the text blocks in the scanned image. After the completion of the processing for the processing target item, the image processing unit 305 selects another processing target item from the unprocessed items again.

In S801, the image processing unit 305 selects one of unprocessed items of the indices among the items registered in the index information of the registered document and sets this item as the processing target item. In the embodiment, one of the items of title (title), issuer company name (sender), form number (number), and total price (total_price) held in the index information of FIG. 7 is selected as the processing target item.

In S802, the image processing unit 305 obtains a "partial pattern" for the processing target item. The partial pattern includes information on a layout (partial layout) of some of the text blocks included in the registration document and information on a range (partial pattern range) including the partial layout.

FIG. 10A illustrates the positions and sizes of the index blocks of the respective items in the registered document to which the document ID of "0001" is assigned in FIG. 7. Broken-line rectangles in FIG. 10A indicate index blocks 1000 to 1003 for the items of title, form number, total price, and issuer company name, respectively.

FIG. 10B is a view illustrating a partial pattern for the item of "issuer company name (sender)". A range illustrated by a one-dot chain line rectangle in FIG. 10B indicates a partial pattern range 1006 for the item of "issuer company name (sender)". The partial pattern range 1006 is determined by using a value preset based on the index block 1003 that is the text block of the item of "issuer company name (sender)".

Text blocks 1004 and 1005 express the text blocks that are at least partially included in the partial pattern range 1006 in the registered document. A partial layout in the registered document expressed by the text blocks 1004 and 1005 and the index block 1003 is the partial layout for the item of issuer company name. The partial layout is expressed by the text block of the processing target item and at least one text block other than the text block of the processing target item.

The layout is information indicating the position information and size of each text block.

The image processing unit 305 determines the partial pattern range 1006 and the partial layout including the index block 1003 and the text blocks 1004 and 1005 as information included in the partial pattern for the item of issuer company name. The partial pattern for each item in the registered document is determined as described above and is stored.

In the embodiment, as described in detail later, the image processing unit 305 searches for a position in the scanned image where arrangement is similar to or the same as the partial layout to inferentially determine the text block of the processing target item in the scanned image.

FIG. 10C is a view illustrating a partial pattern for the item of "title (title)". Also in the case of the title, the image processing unit 305 determines a partial pattern range 1007 and a partial layout including the index block 1000 for the title and the text blocks 1001 and 1008 to 1013 included in the partial pattern range 1007 as the partial pattern.

Note that the size of the partial pattern range 1007 is different from the size of the partial pattern range 1006 in FIG. 10B. The size of the partial pattern range may vary as described above depending on the characteristics of the item. Alternatively, the size of the partial pattern range may be common for all items. A method of determining the size of the partial pattern range is described in Embodiment 2.

Note that the partial pattern does not have to be determined every time the index extraction processing is executed after the scanning of the original document. For example, in the registration of the document, the partial pattern may be determined for each item and stored in advance as part of the extraction rules illustrated in FIG. 7. Specifically, in S802, the image processing unit 305 only has to obtain the stored partial pattern for the processing target item.

In subsequent S803 and S804, the image processing unit 305 determines a position (XY candidate position) in the scanned image where a region with a high matching degree with the partial layout for the processing target item is present. As a method of determining the XY candidate position, there may be used, for example, a method in which the partial pattern is moved across a search range in the scanned image as in template matching and a matching degree is calculated to inferentially determine the candidate position. In the embodiment, a candidate position in the Y direction in the search range is determined and the position (Y position) in the Y direction is narrowed down to reduce the calculation amount. A method is described in which, after the aforementioned operation, for each of candidates of Y position (Y candidate positions), the XY candidate position is determined by moving the partial pattern in the X direction to reduce the calculation amount.

In S803, the image processing unit 305 determines the Y candidate positions where the text blocks in the scanned image are similar to the text blocks in the partial pattern for the processing target item in the registered document.

FIGS. 11A to 11C are views for explaining processing of determining the Y candidate positions. Description is given assuming that the processing target item is the issuer company name (sender).

FIG. 11A is a view illustrating the partial pattern for the issuer company name (sender) in the registered document and is a view similar to FIG. 10B. FIG. 11B illustrates the scanned image and broken-line rectangles indicate aligned text blocks. Moreover, the document illustrated by the scanned image illustrated in FIG. 11B is a document determined to be the same type of document as the registered document "0001" but is an example in which the number of rows of items in a table structure is greater than that in the registered document of FIG. 7. Thus, an index block 1101 for the issuer company name (sender) to be inferentially determined in the scanned image is shifted to a lower position than the index block 1002 for the issuer company name (sender) in the registered document.

FIG. 11C is a view in which the text block 1003 among the text blocks 1003 to 1005 included in the partial pattern for the issuer company name and expressing the partial layout is superimposed on the same coordinate system as the text blocks in the scanned image. Determination of the Y candidate positions is described by using FIG. 11C while focusing on the text block 1003 in the partial pattern.

A search range 1100 illustrated by a one-dot chain line rectangle in FIG. 11C expresses a range searched to determine the Y candidate positions for the processing target item. Text blocks 1101 to 1109 illustrated by broken line rectangles are text blocks whose centers of the rectangles are in the search range 1100 among the text blocks in the scanned image illustrated in FIG. 11B.

For the determination of the Y candidate positions, the image processing unit 305 first selects one of the text blocks (text block 1003 in FIG. 11C) included in the partial layout. Then, the image processing unit 305 superimposes the selected text block on the same coordinate system as the text blocks in the scanned image and calculates a difference amount between the Y position of the center of the rectangle of the selected text block and that of each of the text blocks (text blocks 1101 to 1109 in FIG. 11C) of the scanned image in the search range. Then, the image processing unit 305 votes for the calculated difference amount in a Y direction shift amount histogram. Any range may be set for bins of the shift amount histogram.

Figure 12A:
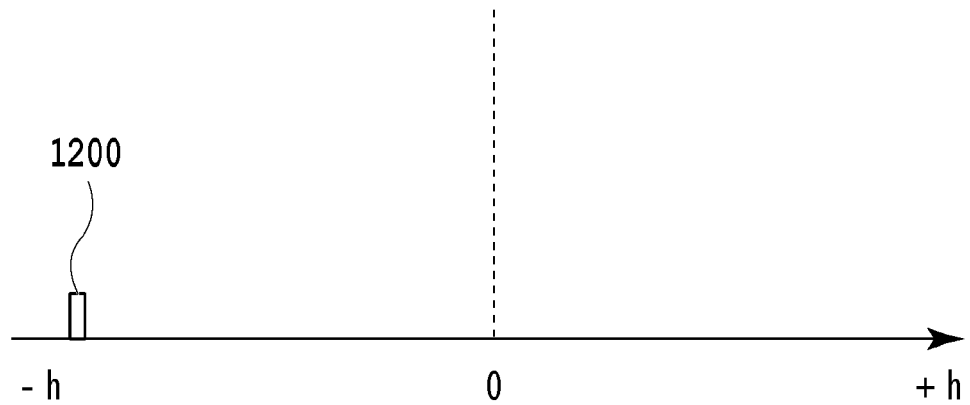
FIGS. 12A and 12B are diagrams illustrating an example of a Y-direction shift amount histogram.
Figure 12B:
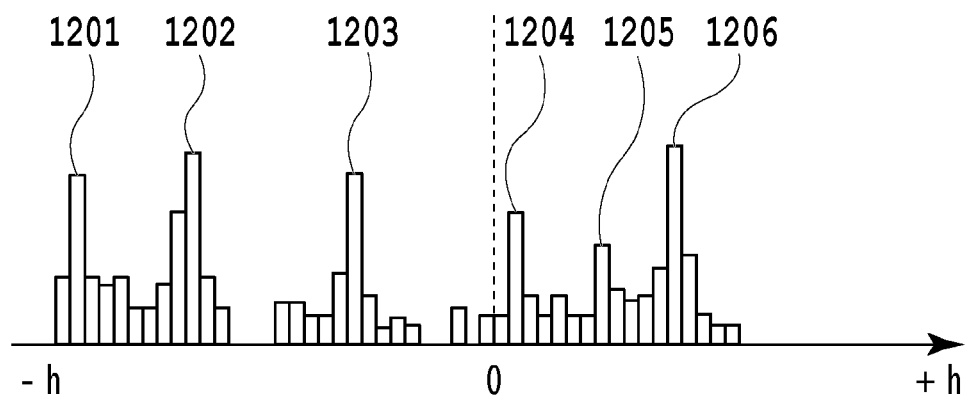

FIGS. 12A and 12B are diagrams illustrating an example of the Y-direction shift amount histogram. FIG. 12A is the shift amount histogram after the voting for the difference amount between the Y position of the text block 1003 in the partial pattern of FIG. 11C and the Y position of the text block 1102 in the scanned image. Reference sign h denotes an upper limit of an absolute value of the search range in the Y direction from the reference. The image processing unit 305 votes for a position 1200 according to the difference amount between the text block 1003 and the text block 1102 in the Y direction. Similarly, the image processing unit 305 performs voting according to the difference amount between the Y center of one text block included in the partial pattern and each of the Y centers of all text blocks in the search range in the scanned image. This voting is performed for all text blocks in the partial pattern. Specifically, the image processing unit 305 also calculates the difference amount between each of combinations of the Y centers of the text blocks 1004 and 1005 in the partial pattern and the Y centers of the text blocks 1101 to 1109 in the search range and votes for the calculated difference amount in the shift amount histogram. The image processing unit 305 then completes the Y-direction shift amount histogram. Note that, in the case where there is a concern of an effect of noise, the generated Y-direction shift amount histogram may be subjected to smoothing.

FIG. 12B is the Y-direction shift amount histogram that is eventually generated. After the completion of the generation of the shift amount histogram, the image processing unit 305 determines peak points as illustrated at positions 1201 to 1206 in the histogram and determines the Y candidate positions based on the Y direction shift amounts depending on the bins of the respective peak points.

Note that the search range 1100 for determining the Y candidate positions in FIG. 11C is automatically determined to be a preset value based on the position of the index block in the partial pattern. The size of the search range may be common among all items. Alternatively, the size of the search range may be determined depending on the property of the processing target item. For example, the index block of the title is often at a fixed position in the document. Accordingly, in the case where the processing target item is the title, the possibility that the index block to be inferentially determined is outside the search range is low even if the search range is made smaller. Thus, a small search range may be set in this case. Making the search range small can reduce the calculation amount and prevent determination of unnecessary candidate positions. Meanwhile, the position of the index block of the item of total price sometimes varies in the vertical direction depending on variation in the number of item rows in the table structure of the document. Accordingly, in the case where the processing target item is the total price, a search range larger in the vertical direction than those for the other items can be set.

In S804, the image processing unit 305 derives a matching degree between the partial layout of the partial pattern and the text blocks in the scanned image based on the Y candidate positions determined in S803.

Figure 13:
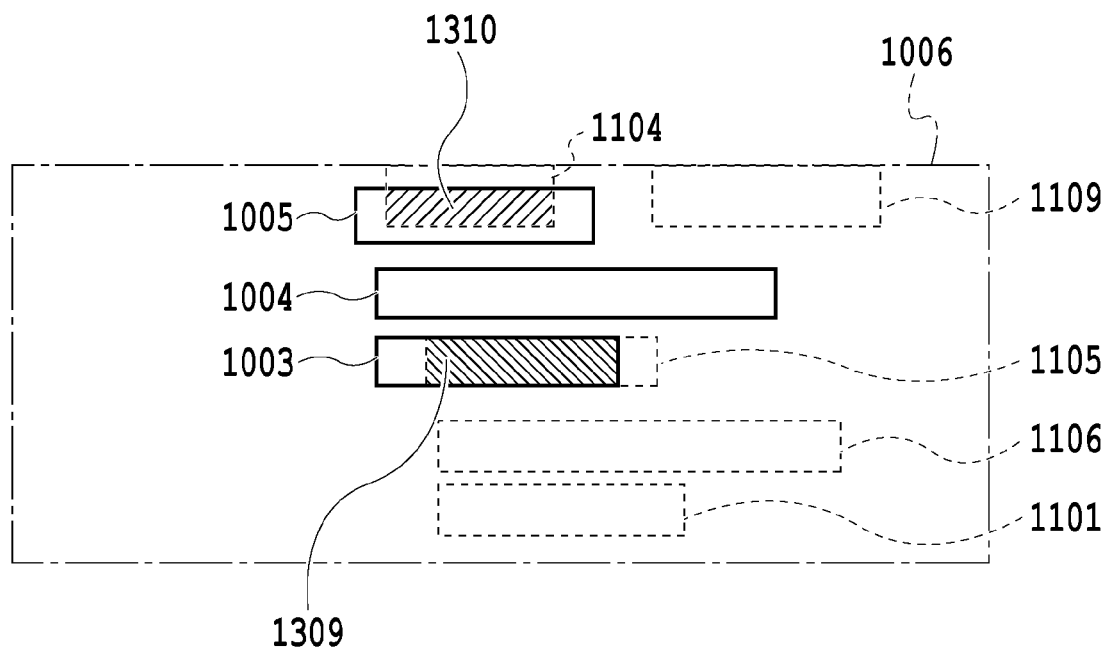
FIG. 13 is a view explaining calculation of a matching degree with the partial pattern.

FIG. 13 is a view illustrating an overlapping state between the partial layout for the processing target item and a layout of the text blocks in the scanned image in the case where the partial layout is laid at a certain position in the scanned image in an overlapping manner. A method of deriving the matching degree between the partial layout and the text blocks in the scanned image is described by using FIG. 13.

In FIG. 13, solid line rectangles are the text blocks 1003 to 1005 forming the partial layout for the processing target item. A one-dot chain line rectangle illustrates the partial pattern range 1006. Broken line rectangles illustrate the text blocks 1101, 1104 to 1106, and 1109 in the scanned image. Oblique-line shaded regions 1309 and 1310 illustrate regions where the text blocks 1003 to 1005 in the partial layout and the text blocks in the scanned image overlap one another.

The matching degree Score between the partial layout and the text blocks in the scanned image are derived by using the following formula (1).

$$\text{Score} = \frac{1}{N_R} \sum_{r \in R} \text{Correlation}(r) \quad \text{formula (1)}$$

In the aforementioned formula (1), R indicates a set of all text blocks forming the partial layout and $N_R$ indicates the total number of text blocks forming the partial layout. In FIG. 13, R is the text blocks 1003 to 1005 and $N_R$ is 3.

Correlation(r) is an individual matching degree of one text block r forming the partial layout. The individual matching degree Correlation(r) of the text block r is derived by using a formula (2).

OverlappingQ is a set of text blocks in the scanned image that overlap the text block r. OverlapArea(r,q) is an area of an overlapping region between the text block r and one text block q among the text blocks in OverlappingQ. Moreover, $N_{OverlappingQ}$ is a total number of text blocks in OverlappingQ.

In FIG. 13, in the case where r is set to the text block 1003, the OverlappingQ includes only the text block 1105 and OverlapArea(r,q) is the region 1309. In the case where r is set to the text block 1005, OverlappingQ includes only the text block 1104 and the region 1310 corresponds to OverlapArea(r,q). In the case where r is set to the text block 1004, there is no corresponding OverlappingQ and $N_{OverlappingQ}$ is 0. Thus, Correlation(r) is 0.

Area_r is the area of the text block r and Area_q is the area of the text block q.

In the deriving of the matching degree using the formula (1), the greater the number of text blocks in the scanned image is and the greater the areas of the text blocks are, the greater the derived value of the individual matching degree Correlation(r) is, in some cases. Accordingly, PenaltyTerm as a penalty term may be added to the matching degree Score as illustrated in the following formula (1)'.

$$\text{Score} = \text{PenaltyTerm} \times \frac{1}{N_R} \sum_{r \in R} \text{Correlation}(r)' \quad \text{formula (1)'}$$

PenaltyTerm in the formula (1)' is derived by using a formula (3).

$$\text{PenaltyTerm} = \frac{\text{TotalArea\_R}}{\text{TotalArea\_R} + \text{TotalArea\_NonOverlappingQ}} \quad \text{formula (3)}$$

TotalArea_R is the sum of areas of all text blocks forming the partial layout. In FIG. 13, TotalArea_R is the total area of the text blocks 1003 to 1005.

TotalArea_NonOverlappingQ is the sum of the areas of the text blocks that overlap none of the text blocks forming the partial layout, among the text blocks in the scanned image present in the partial pattern range. In the case of FIG. 13, TotalArea_NonOverlappingQ is the sum of the areas of the text blocks 1101, 1106, and 1109 that overlap none of the text blocks 1003 to 1005, among the text blocks 1101, 1104, 1105, 1106, and 1109 in the partial pattern range 1006.

Providing the penalty term enables such adjustment that matching degree is reduced in the case where the text blocks in the scanned image are present in a range where the text blocks forming the partial layout in the partial pattern range 1006 are absent. Accordingly, also in the case where there are few text blocks forming the partial layout, the matching degree can be derived by using information on the region where the text blocks forming the partial layout in the partial pattern range are absent. Note that the method of deriving the matching degree is not limited to the deriving using the formula (2)

$$\text{Correlation}(r) = \begin{cases} \sum_{q \in OverlappingQ} \left( \frac{\text{OverlapArea}(r, q)}{\text{Area\_r}} \right) \times \left( \frac{\text{OverlapArea}(r, q)}{\text{Area\_q}} \right), & N_{OverlappingQ} > 0 \\ 0, & N_{OverlappingQ} = 0 \end{cases}$$

aforementioned formulae and any method may be used as long as the matching degree with the partial layout can be determined.

In S804, the image processing unit 305 places the partial pattern (partial layout and partial pattern range) such that the index block is located at one of the Y candidate positions determined in S803. Then, the image processing unit 305 moves the partial pattern in the X direction and derives the matching degree at each position. The image processing unit 305 performs this operation for all Y candidate positions.

FIGS. 14A to 14E are views illustrating processing in this step for one of the Y candidate positions determined in S803. In FIGS. 14A to 14E, solid line rectangles are the text blocks 1003 to 1005 forming the partial layout and one-dot chain line rectangles illustrate the partial pattern range 1006. Moreover, broken line rectangles illustrate the text blocks 1101, 1105, and 1106 in the scanned image and oblique line regions illustrate regions where the text blocks in the partial layout and the text blocks in the scanned image overlap one another. Furthermore, FIGS. 14A to 14E illustrate the processing in this step such that the processing proceeds in the order of FIG. 14(a) to (e), and illustrate a state where the matching degree at each position is derived while the partial pattern is moved in the X direction (from left to right) in the search range. Similar processing is performed for each of the Y candidate positions.

Figure 14:
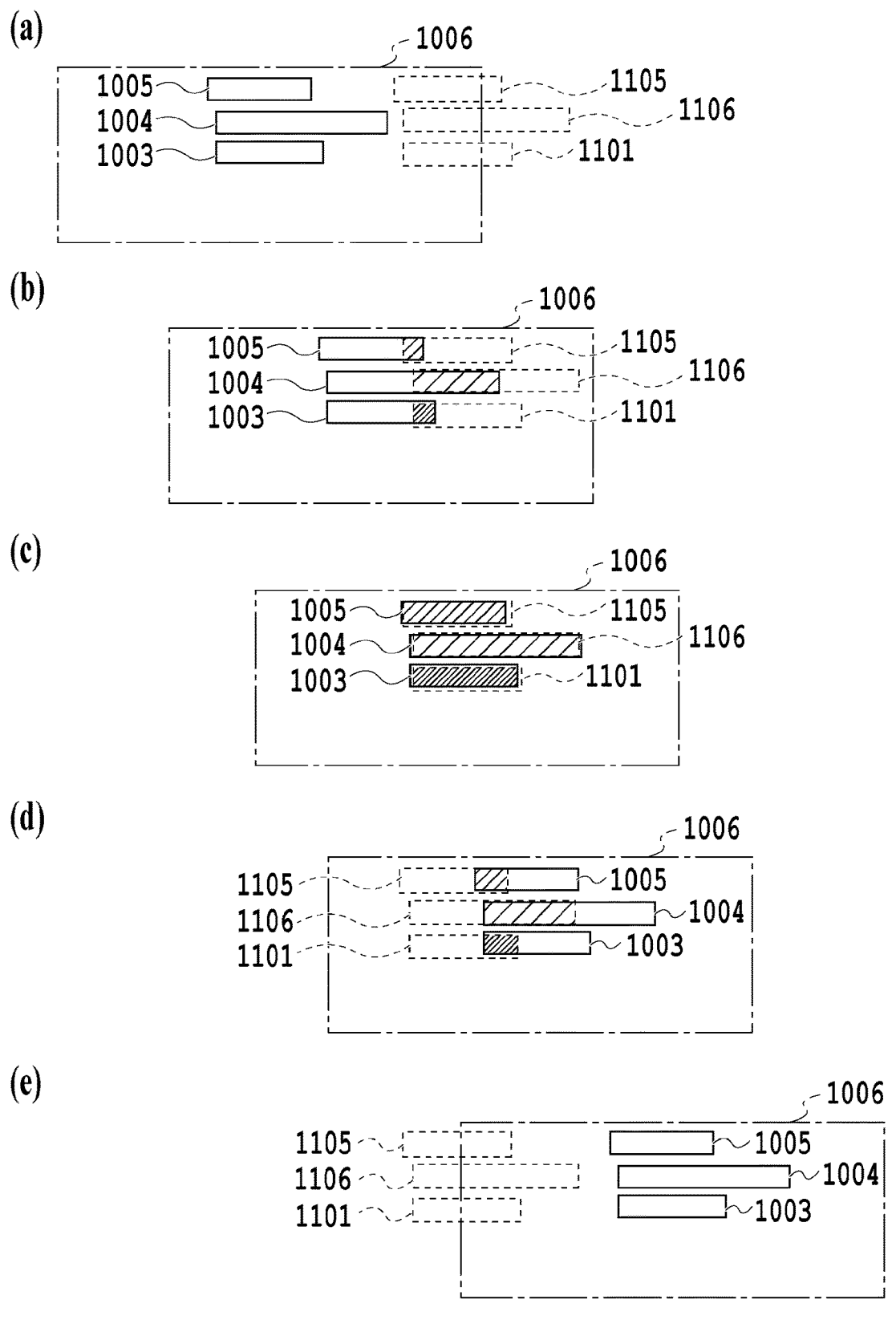
FIG. 14 is a view explaining the calculation of the matching degree with the partial pattern.

In S805, the image processing unit 305 determines a position where the matching degree derived in S804 is the greatest as an XY candidate position. For example, in the case of FIGS. 14A to 14E, the matching degree with the partial pattern (partial layout) is the greatest at the position illustrated in FIG. 14(c). Accordingly, the position of the text block 1003 indicating the index block included in the partial layout in FIG. 14(c) is determined as the XY candidate position.

In S806, the image processing unit 305 determines whether the matching degree at the XY candidate position determined in S805 is equal to or higher than a predetermined threshold.

If the matching degree is equal to or higher than the threshold (YES in S806), in S807, the image processing unit 305 inferentially determines that the XY candidate position in the scanned image determined in S805 is the position where the text block (index block) of the processing target item is present. The image processing unit 305 performs processing of inferentially determining the index block of the processing target item in the scanned image, based on the inferentially-determined position.

For example, the image processing unit 305 determines whether the text block in the scanned image overlapping the index block of the processing target item in the registered document satisfies predetermined conditions in the case where the index block is shifted to the XY candidate position in the scanned image. The predetermined conditions are, for example, such conditions that an overlapping ratio indicating a degree of overlapping with the index block of the processing target item in the registered document is equal to or higher than a predetermined value and the distance between an upper left coordinate of the text block in the scanned image and that of the index block of the processing target item in the registered document is within a certain range.

If the image processing unit 305 determines that there is a text block satisfying the predetermined conditions (YES in S807), the processing proceeds to S808. In S808, the image processing unit 305 inferentially determines that the text block in the scanned image determined to satisfy the predetermined conditions in S807 is the text block (index block) including the character string indicating the processing target item selected in S801.

If the matching degree is lower than the threshold (NO in S806) or the image processing unit 305 determines that there is no text block satisfying the conditions (NO in S807), the processing proceeds to S809. In S809, the image processing unit 305 determines that a text block corresponding to the processing target item selected in S801 is absent in the scanned image. For example, in the case where the character string corresponding to the processing target item is not written in a predetermined region in the scanned image or erroneous inferential determination of the position is performed in S804, the determination in S809 is performed.

In S810, the image processing unit 305 determines whether the processing of inferentially determining the index block is completed for all items registered in the index information of the registered document. If there is an unprocessed item, the processing returns to S801.

If the processing is completed for all items, the processing of this flowchart is terminated and the processing proceeds to S508. In S508, the image processing unit 305 executes the OCR processing on the inferentially-determined index blocks of the respective items and extracts the character strings corresponding to the respective items as the indices.

As described above, in the embodiment, the indices included in the scanned image are extracted by using part of the layout of the text blocks. Accordingly, in the embodiment, even if the position of the index block included in the scanned image is different from that in the registered document due to variations in the written contents in the input document, the indices can be extracted. Moreover, in the embodiment, the type of input document is determined by means of document matching and the extraction rules linked to the type of document is used. Accordingly, even in the processing of inferentially determining the index block by using the partial layout of the text blocks, erroneous extraction of the indices can be suppressed. Furthermore, in the document matching and the index block inferential determination processing, among the foreground regions obtained as a result of the preprocessing of the OCR processing, only the text blocks are used. Accordingly, the index extraction processing can be performed without spending unnecessary calculation cost.

Embodiment 2

In Embodiment 1, description is given of the method in which the partial pattern range is determined based on the preset value. However, if the partial pattern range is set to be too large, the position of the index block cannot be appropriately inferentially determined in the case where the layout is different only in a region around the index block. Meanwhile, if the partial pattern range is small, the number of text blocks forming the partial layout is determined to be small and the searching for a region with a high matching degree in the scanned image becomes difficult. Accordingly, in the embodiment, description is given of a method of determining an appropriate size of the partial pattern range. Note that this embodiment is described while focusing on differences from Embodiment 1. Portions that are not clearly described are the same configurations and processing as those in Embodiment 1.

The number of text blocks present around each index block and the layout thereof vary depending on the type of document. Accordingly, in the embodiment, a region including the index block of the processing target item is increased in size stepwise and the number of text blocks overlapping this region is counted to determine the size of the partial pattern range. Then, the region at a point where the number of overlapping text blocks reaches or exceeds a certain number is determined as the partial pattern range for this item.

FIGS. 15A and 15B are views for explaining the method of determining the partial pattern range in the embodiment. In FIG. 15A, a solid line rectangle is the index block 1000 of the title and one-dot chain line rectangles are regions for determining the partial pattern range for the title. As the regions, an initial region 1500, a second stage region 1501, and a maximum region 1502 are illustrated. FIG. 15A illustrates a state where the region for determining the partial pattern range for the item of title is changed stepwise. The region is increased in size stepwise from the initial region to the maximum region and the number of text blocks overlapping this region other than the index block is counted. Then, the region illustrated by the one-dot chain line rectangle in the case where the counted number of text blocks reaches or exceeds a predetermined number is determined as the partial pattern range for this item. Note that the predetermined number is preferably 1 or greater. In the embodiment, description is given assuming that the predetermined number is 5.

The method of determining the partial pattern range in the embodiment is specifically described. First, the number of text blocks that overlap the initial region 1500 even if only slightly is counted. In this case, since there is no text block other than the index block 1000, the processing proceeds to the next stage.

Next, the region is increased in size and the number of text blocks that overlap even only slightly the second stage region 1501 is counted. FIG. 15B is a view in the case where the region for determining the partial pattern range is set to the second stage region 1501. As illustrated in FIG. 15B, the text blocks 1001 and 1008 to 1013 overlap the second stage region 1501. Accordingly, the number of text blocks overlapping the second stage region 1501 is counted to be 7. The number of overlapping text blocks is thus determined to be equal to or greater than 5 that is the predetermined number. Thus, the position and size of the partial pattern range for the title is determined to be those indicated by the second stage region 1501. Accordingly, the layout formed of the index block 1000 and the text blocks 1001 and 1008 to 1013 that are at least partially included in the partial pattern range is determined as the partial layout for the title.

Alternatively, the following method may be used. The number of text block around the index block varies depending on the item and a region where there are few changes in the layout of the text blocks due to the written contents varies. Accordingly, for example, the size of the partial pattern range may be varied depending on the property of the item. In other words, the size of the partial pattern depending on the property of the item may be preset.

The item of title has such a characteristics that the text blocks are absent near the text block of title in many cases. Moreover, the title has such a characteristics that the title is present in an upper portion of the document where there are few changes in the layout of the text blocks due to changes in the written contents in the document. Accordingly, as illustrated in the partial pattern range 1007 of FIG. 10C, in the case where the item is the title of document, the partial pattern range may be determined to be a region covering the entire image width in the X direction and covering about a quarter of the image in the Y direction.

As described above, in the embodiment, the partial pattern range is determined depending on the document. Thus, the partial pattern range appropriately determined depending on the document can improve the accuracy of the index block inferential determination processing.

Embodiment 3

In Embodiment 1, description is given of the method in which the position where the matching degree derived by using the partial pattern is the greatest is determined as the XY candidate position and, if the matching degree of the XY candidate position is equal to or higher than the predetermined threshold, the position where the index block of the processing target item is present is inferentially determined based on the XY candidate position.

However, there is a case where the input document includes multiple regions where arrangement of the text blocks is similar to the arrangement of the partial layout in the registered document. In the case where the input document includes multiple regions similar to the partial layout, the inferential determination of the index block of the processing target item in the input document may fail in the method of Embodiment 1.

Accordingly, in the embodiment, description is given of a method of appropriately inferentially determining the position of the index block in the input document even if the input document includes multiple regions similar to the partial layout for the processing target item. Note that this embodiment is described while focusing on differences from Embodiment 1. Portions that are not clearly described are the same configurations and processing as those in Embodiment 1.

Figure 16:
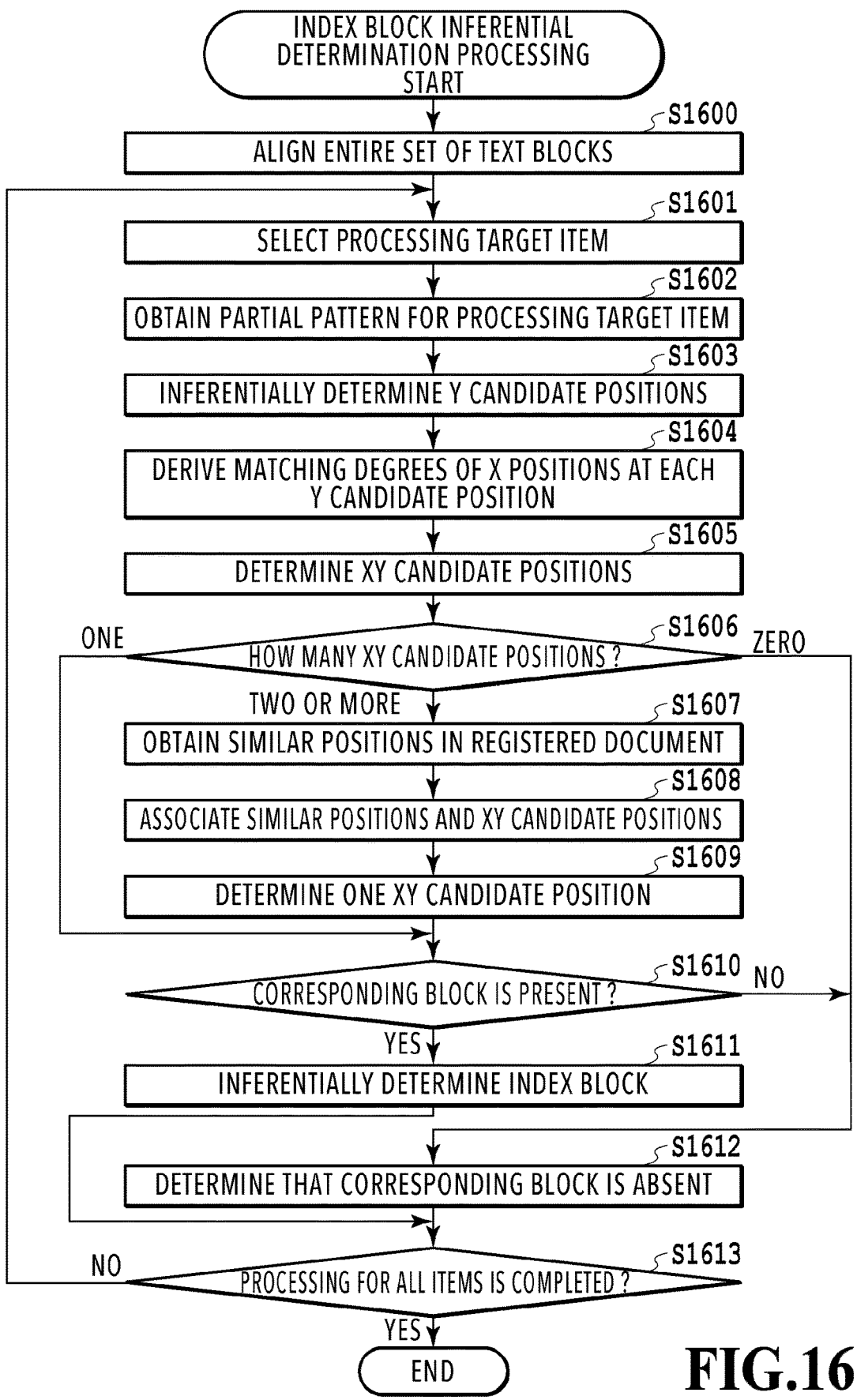
FIG. 16 is a flowchart of index block inferential determination processing.

FIG. 16 is a flowchart for explaining the index block inferential determination processing of S507 in the embodiment. Details of the index block inferential determination processing in the embodiment are described according to the flowchart of FIG. 16. Since S1600 to S1604 are the same as S800 to S804, description thereof is omitted.

In S1605, the image processing unit 305 determines the XY positions in the scanned image where the matching degree derived in S1604 is equal to or higher than the predetermined threshold. Multiple XY positions are sometimes not determined as a result of this step but the XY positions determined in this step are referred to as XY candidate positions for the sake of convenience.

FIGS. 17A and 17B are views illustrating an example of the registered document including multiple regions similar to the partial layout formed of the index block and blocks around the index block. FIG. 17A is a view illustrating the example of the registered document. FIG. 17B is a view illustrating the partial pattern in the case where a text block 1705 including a character string corresponding to an item of "Quotation Date" in the registered document of FIG. 17A is set as the index block. In FIG. 17B, a one-dot chain line rectangle indicates a partial pattern range 1700 for the item of "Quotation Date" and text blocks 1701 to 1706 illustrated by solid line rectangles indicate text blocks forming the partial layout for the item of "Quotation Date". In the description of the flowchart of FIG. 16, processing in the case where the "Quotation Date" is set as the processing target item is described.

FIGS. 18A to 18E are views for explaining the input document. FIG. 18A is a view illustrating the input document and, in the description of this flowchart, it is assumed that the index block inferential determination processing is performed on the scanned image obtained as a result of scanning this input document. Moreover, description is given assuming that the registered document of FIGS. 17A and 17B is determined as the document similar to the input document of FIG. 18A by the document matching in S504.

FIGS. 18B to 18E are each a view in which the partial pattern for the "Quotation Date" in FIG. 17B is superimposed on an image depicting the text blocks detected as a result of performing the block selection processing on the scanned image of the input document in FIG. 18A. Rectangles in each of FIGS. 18B to 18E illustrate the partial pattern. Specifically, solid line rectangles are the text blocks forming the partial layout and a one-dot chain line rectangle is the partial pattern range.

The position of the partial pattern illustrated in each of FIGS. 18B to 18E is a position in the case where the matching degree derived in S1604 is equal to or higher than the predetermined threshold. Accordingly, XY positions 1801 to 1804 of the index block among the text blocks forming the partial layout and illustrated by the solid line rectangles are determined as the XY candidate positions as a result of the processing in this step.

In a document in which simple arrangement of the text blocks repeatedly appears as in the input document illustrated in FIG. 18A, if the index block is present in the repeatedly arranged text blocks, there are multiple positions determined as the XY positions where the matching degree is equal to or higher than the threshold. Thus, the number of XY candidate positions determined as a result of performing the processing of this step on the input document illustrated in FIG. 18A is two or more.

In S1606, the image processing unit 305 switches processing depending on the number of XY candidate positions determined in S1605. If the number of XY candidate positions is one, the processing proceeds to S1610. If the number of XY candidate positions is zero, the processing proceeds to S1612. Since the processing in S1612 is the same as that in S809, description thereof is omitted.

If the number of XY candidate positions is two or more, the processing proceeds to S1607. In S1607, the image processing unit 305 obtains a similar position(s) that is (are) a position(s) in the registered document and that is (are) a position(s) where the matching degree with the partial layout for the processing target item is equal to or higher than a predetermined threshold.

The image processing unit 305 superimposes the partial layout included in the partial pattern for the processing target item at a certain position in the registered document, derives the matching degree with the text blocks, and determines an XY position in the registered document where the matching degree is equal to or higher than the predetermined threshold as the "similar position". A method of calculating the matching degree between the text blocks in the registered document and the text blocks in the partial layout may be the same deriving method as that in S1602 to S1604. Specifically, the matching degree may be derived in the same procedure with the target being changed from the input document to the registered document.

FIGS. 19A to 19E are views for explaining the similar positions in the registered document. FIG. 19A is a view illustrating the same registered document as that in FIG. 17A. FIGS. 19B to 19E are each a view in which the partial pattern for the "Quotation Date" in FIG. 17B is superimposed on an image depicting the text blocks detected as a result of performing the block selection processing on the scanned image of the registered document in FIG. 19A. Rectangles in each of FIGS. 19B to 19E illustrate the partial pattern. Specifically, solid line rectangles are the text blocks forming the partial layout and a one-dot chain line rectangle is the partial pattern range.

The position of the partial pattern in each of FIGS. 19B to 19E is a position thereof in the case where the derived matching degree is equal to or higher than the predetermined threshold. Accordingly, the XY position of the index block among the text blocks forming the partial layout is determined to be similar positions 1901 to 1904. In this step, position information of the similar positions for the processing target item is obtained. The similar positions 1901 to 1904 include the XY position of the index block 1705 in the registration illustrated in FIG. 17B, like the similar position 1902.

Note that the processing of determining the similar positions in the registered document does not have to be performed in S1607. For example, the configuration may be such that the similar positions are determined after the determination of the partial pattern for each item in the registration of the document and information on the similar positions is saved in advance as part of the extraction rules illustrated in FIG. 7. Specifically, in S1607, the image processing unit 305 only has to obtain the similar positions as one of the stored extraction rules for the processing target item.

In S1608, the image processing unit 305 associates the XY candidate positions in the input document determined in S1605 with the similar positions in the registered document obtained in S1607. Specifically, the image processing unit 305 associates the XY candidate positions sorted by Y position and the similar positions sorted by the same condition with one another in order of Y position from one side and then associates the XY candidate positions and the similar positions with one another in order of Y position from the other side.

FIG. 20 is a view for explaining processing of this step. Numerical values in the table are numerical values indicating reference numerals denoting the positions in the document illustrated in FIGS. 18A to 18E and 19A to 19E.

FIG. 20A is a view illustrating association in the case where the number of similar positions is the same as the number of XY candidate positions as illustrated in FIGS. 18A to 18E and 19A to 19E. A column 2001 includes the similar positions sorted by Y position. A column 2002 includes the XY candidate positions that are sorted by Y position and that are associated with the similar positions in the column 2001 in descending order of Y position. A column 2003 includes the XY candidate positions that are sorted by Y position and that are associated with the similar positions in the column 2001 in ascending order of Y position. In FIG. 20A, the XY candidate positions in the column 2002 and the XY candidate positions in the column 2003 are associated with the same similar positions, respectively.

FIG. 20B is a view for explaining a method of association in this step in the case where the number of similar positions is smaller than the number of XY candidate positions. FIG. 20B is a view illustrating association in a situation where, for example, the matching degree with the registered document in the case where the partial pattern is superimposed at the position of the registration document illustrated in FIG. 19E is smaller than the threshold and only the similar positions 1901 to 1903 are obtained in S1607. A column 2011 includes the similar positions sorted by Y position. A column 2012 includes the XY candidate positions associated with the similar positions in the column 2011 in descending order of Y position. A column 2013 includes the XY candidate positions associated with the similar positions in the column 2011 in ascending order of Y position. In FIG. 20B, the XY candidate positions associated with the similar positions in the result of the association in descending order are different from those in the result of the association in ascending order.

FIG. 20C is a view for explaining a method of association in this step in the case where the number of similar positions is greater than the number of XY candidate positions. FIG. 20C is a view illustrating association in a situation where, for example, the matching degree with the input document in the case where the partial pattern is superimposed at the position of the input document illustrated in FIG. 18E is smaller than the threshold and only the XY candidate positions 1801 to 1803 are determined as the XY candidate positions in S1605. A column 2021 includes the similar positions sorted by Y position. A column 2022 includes the XY candidate positions associated with the similar positions in the column 2021 in descending order of Y position. A column 2023 is the XY candidate positions associated with the similar positions in the column 2021 in ascending order of Y position. The result of the association in descending order is different from the result of the association in ascending order. In the association in descending order, no XY candidate position corresponding to the similar position 1904 is found and, in the association in ascending order, no XY candidate position corresponding to the similar position 1901 is found.

In S1609, the image processing unit 305 determines one XY candidate position from the XY candidate positions determined in S1605 based on the results of the association performed in S1608.

Meanwhile, in the results of the association performed in S1608, the result of the association in descending order sometimes matches the result of the association in ascending order as illustrated in FIG. 20A. In this case, the image processing unit 305 determines the XY position associated with the similar position indicating the position of the index block in the registration among the XY candidate positions, as the one XY candidate position. In the example of FIG. 20A, the image processing unit 305 determines the XY position 1802 associated with the similar position 1902 indicating the position of the index block, as the one XY candidate position.

Meanwhile, in the results of association performed in S1608, the result of the association in descending order sometimes does not match the result of the association in ascending order as illustrated in FIGS. 20B and 20C. In this case, first, the image processing unit 305 determines the XY position in the input document associated with the similar position indicating the position of the index block in the case where the association in descending order is performed. Then, the image processing unit 305 determines the XY position in the input document associated with the similar position indicating the position of the index block in the case where the association in ascending order is performed.

In the example of FIG. 20B, the image processing unit 305 determines the XY positions 1802 and 1803 associated with the similar position 1902 indicating the position of the index block. In the example of FIG. 20C, the image processing unit 305 determines the XY positions 1802 and 1801 associated with the similar position 1902. One of the two determined XY positions that has the higher matching degree derived in S1604 is determined as the one XY candidate position among the XY candidate positions. Note that one of the two XY positions may be selected without using the matching degree. For example, the image forming apparatus may display the two XY positions, receive an instruction from the user to learn which one of the association in descending order and the association in ascending order is to be used for each item, and use the learned information.

After the determination of the one XY candidate position from the XY candidate positions, the processing proceeds to S1610. In S1610, as in the processing of S807, the image processing unit 305 performs processing of inferentially determining that the XY candidate position is the position where the index block to be processed is located and inferentially determining the index block of the processing target item among the text blocks in the scanned image. Since S1611 is the same as S808 and S1613 is the same as S810, description thereof is omitted.

As described above, in the embodiment, in the case where the input document includes multiple XY candidate positions where the matching degree is equal to or higher than the threshold, the XY candidate positions are associated with the similar positions in the registered document where the matching degree with the partial pattern is equal to or higher than the threshold and then one XY candidate position is determined. Accordingly, even in the case where the document includes multiple regions similar to the partial layout formed of the index block and the text blocks around the index blocks, the accuracy of the index block inferential determination processing can be improved.

Other Embodiments

In the aforementioned embodiment, description is given of the example in which the image forming apparatus 100 alone performs the processes in the respective steps in the flowchart of FIG. 4. Alternatively, there may be employed a mode in which some or all of these processes are performed in another image processing apparatus on the system 105 having the functions of FIG. 3.

For example, the following configuration may be employed. The scan processing is executed in the image forming apparatus 100 and the scanned image is transmitted to the terminal 101 via a network. The terminal 101 has functions similar to the image processing unit 305 and executes the index extraction processing. In this case, the terminal 101 sends back the index extraction result to the image forming apparatus 100 and the image forming apparatus 100 performs file generation and file transmission based on the obtained index extraction result.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-043075, filed Mar. 12, 2020, and Japanese Patent Application No. 2020-148383, filed Sep. 3, 2020, which are hereby incorporated by reference wherein in its entirety.

What is claimed is:

1. An image processing apparatus comprising:
at least one memory that stores instructions; and
at least one processor that execute the instructions to perform:
detecting text blocks in an input image;
determining a registered document corresponding to the input image among a plurality of registered documents;
determining a text block in the input image that corresponds to a processing target item, based on a partial layout defined in the determined registered document and including a first text block corresponding to the processing target item and at least one second text block present near the first text block; and
obtaining a character string corresponding to the processing target item by performing character recognition processing on the determined text block,
wherein the determination of the text block is performed by superimposing the partial layout at any of positions in a search range in the input image and deriving a matching degree based on a size of an area in which the text blocks included in the partial layout overlap the text blocks in the input image, and
wherein, in the determination of the text block, positions in a vertical direction used to determine the text block corresponding to the processing target item are determined based on differences between positions of the text blocks included in the partial layout in the vertical direction and positions of the text blocks in the search range in the vertical direction, and the matching degree at each of positions in a case where the partial layout is superimposed in a horizontal direction at each of the positions in the vertical direction in the search range is derived, and
wherein, in the determination of the text block,
candidate positions in the input image are determined, the candidate position being a position at which the matching degree is equal to or higher than a threshold, and
in a case where the number of the candidate positions is one, the candidate position is determined as a position used to perform the determination of the text block in the input image, or
in a case where the number of candidate positions is two or more, positions in the registered document are obtained as similar positions and the candidate positions and the similar positions are associated with one another to determine the position used to perform the determination of the text block in the input image, the similar position being position at which a matching degree is equal to or higher than a threshold in a case where the text blocks included in the partial layout are superimposed at one of positions in the registered document, the matching degree being derived by the same method as a method of deriving the matching degree to determine the candidate positions.

2. The image processing apparatus according to claim 1, wherein, in the determination of the text block, the matching degree is derived with the search range set to a predetermined region including a position in the input image which corresponds to a position of the text block corresponding to the processing target item in the determined registered document.

3. The image processing apparatus according to claim 1, wherein the determination of the text block is performed based on a position at which the matching degree is equal to or higher than a threshold and the matching degree is the highest in the input image.

4. The image processing apparatus according to claim 1, wherein, in the determination of the text block, in a case where the number of the candidate positions is two or more and the number of the candidate positions and the number of the similar positions are the same, the candidate position associated with the similar position corresponding to the position of the text block corresponding to the processing target item is determined as the position used to perform the determination of the text block in the input image as a result of associating the candidate positions and the similar positions arranged in the same condition with one another in order from one side.

5. The image processing apparatus according to claim 1, wherein, in a case where the number of the candidate positions is two or more and the number of candidate positions and the number of the similar positions are different,
obtaining
a first position indicated by the candidate position associated with the similar position corresponding to the position of the text block corresponding to the processing target item as a result of associating the candidate positions and the similar positions arranged in the same condition with one another in order from one side and
a second position indicated by the candidate position associated with the similar position corresponding to the position of the text block corresponding to the processing target item as a result of associating the candidate positions and the similar positions arranged in the same condition with one another from other side, and
determining a position satisfying a predetermined condition out of the first position and the second position as the position used to perform the determination of the text block in the input image.

6. The image processing apparatus according to claim 1, wherein, in the determination of the text block, the text block corresponding to the processing target item in the registered document is arranged at a position in the input image based on the matching degree and, in a case where a text block in the input image overlapped by the arranged text block satisfies a predetermined condition, the overlapped text block is determined as the text block corresponding to the processing target item in the input image.

7. The image processing apparatus according to claim 6, wherein the predetermined condition is a case where an overlapping degree between the text block corresponding to the processing target item in the registered document and the overlapped text block in the input image is a predetermined value or higher and a distance between a vertex of the text block corresponding to the processing target item in the registered document and a vertex of the overlapped text block in the input image is within a certain range.

8. The image processing apparatus according to claim 1, wherein
a predetermined range based on the text block corresponding to the processing target item in the registered document is set, and
in a case where the partial layout is superimposed on the input image, the matching degree is adjusted such that the greater the area of the text block that is among the text blocks included in the predetermined range in the input image and that does not overlap the text blocks included in the partial layout is, the lower the matching degree is.

9. The image processing apparatus according to claim 8, wherein the predetermined range is determined based on a region that is based on the text block corresponding to the processing target item in the registered document and that includes a predetermined number or more of text blocks.

10. The image processing apparatus according to claim 1, wherein the text blocks to be included in the partial layout are determined by the text block corresponding to the processing target item in the registered document and the text blocks included in a predetermined range based on the text block corresponding to the processing target item in the registered document.

11. The image processing apparatus according to claim 1, wherein the registered document corresponding to the input image is determined based on a degree of similarity between a layout of the detected text blocks in the input image and a layout of the text blocks in each of the registered documents.

12. The image processing apparatus according to claim 1, wherein, in a case where the registered document corresponding to the input image is undeterminable, the input image is registered as a new document.

13. The image processing apparatus according to claim 1, wherein a property of the input image is set based on the obtained character string corresponding to the processing target item.

14. An image processing method comprising:
detecting text blocks in an input image;
determining a registered document corresponding to the input image among a plurality of registered documents;
determining a text block in the input image that corresponds to a processing target item, based on a partial layout defined in the determined registered document and including a first text block corresponding to the processing target item and at least one second text block present near the first text block; and
obtaining a character string corresponding to the processing target item by performing character recognition processing on the determined text block,
wherein the determination of the text block is performed by superimposing the partial layout at any of positions in a search range in the input image and deriving a matching degree based on a size of an area in which the text blocks included in the partial layout overlap the text blocks in the input image, and
wherein, in the determination of the text block, positions in a vertical direction used to determine the text block corresponding to the processing target item are determined based on differences between positions of the text blocks included in the partial layout in the vertical direction and positions of the text blocks in the search range in the vertical direction, and the matching degree at each of positions in a case where the partial layout is superimposed in a horizontal direction at each of the positions in the vertical direction in the search range is derived, and
wherein, in the determination of the text block,
candidate positions in the input image are determined, the candidate position being a position at which the matching degree is equal to or higher than a threshold, and
in a case where the number of the candidate positions is one, the candidate position is determined as a position used to perform the determination of the text block in the input image, or
in a case where the number of candidate positions is two or more, positions in the registered document are obtained as similar positions and the candidate positions and the similar positions are associated with one another to determine the position used to perform the determination of the text block in the input image, the similar position being position at which a matching degree is equal to or higher than a threshold in a case where the text blocks included in the partial layout are superimposed at one of positions in the registered document, the matching degree being derived by the same method as a method of deriving the matching degree to determine the candidate positions.

15. A non-transitory computer readable storage medium storing a program which causes a computer to perform an image processing method comprising:
detecting text blocks in an input image;
determining a registered document corresponding to the input image among a plurality of registered documents;
determining a text block in the input image that corresponds to a processing target item, based on a partial layout defined in the determined registered document and including a first text block corresponding to the processing target item and at least one second text block present near the first text block; and
obtaining a character string corresponding to the processing target item by performing character recognition processing on the determined text block,
wherein the determination of the text block is performed by superimposing the partial layout at any of positions in a search range in the input image and deriving a matching degree based on a size of an area in which the text blocks included in the partial layout overlap the text blocks in the input image, and
wherein, in the determination of the text block, positions in a vertical direction used to determine the text block corresponding to the processing target item are determined based on differences between positions of the text blocks included in the partial layout in the vertical direction and positions of the text blocks in the search range in the vertical direction, and the matching degree at each of positions in a case where the partial layout is superimposed in a horizontal direction at each of the positions in the vertical direction in the search range is derived, and
wherein, in the determination of the text block,
candidate positions in the input image are determined, the candidate position being a position at which the matching degree is equal to or higher than a threshold, and in a case where the number of the candidate positions is one, the candidate position is determined as a position used to perform the determination of the text block in the input image, or in a case where the number of candidate positions is two or more, positions in the registered document are obtained as similar positions and the candidate positions and the similar positions are associated with one another to determine the position used to perform the determination of the text block in the input image, the similar position being position at which a matching degree is equal to or higher than a threshold in a case where the text blocks included in the partial layout are superimposed at one of positions in the registered document, the matching degree being derived by the same method as a method of deriving the matching degree to determine the candidate positions.

* * * * *